United States Patent
Singal et al.

(10) Patent No.: US 10,503,352 B2
(45) Date of Patent: Dec. 10, 2019

(54) CONTROL OF REPRESENTATION INTERACTION WITHIN AN APPLICATION LAUNCHER

(71) Applicant: Microsoft Microsoft Technology Licensing, LLC, Redmond, WA (US)

(72) Inventors: Poorva Singal, Redmond, WA (US); Nora Iordanova Micheva, Seattle, WA (US); Jaclyn Carley Knapp, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 645 days.

(21) Appl. No.: 14/599,895

(22) Filed: Jan. 19, 2015

(65) Prior Publication Data
US 2016/0210018 A1 Jul. 21, 2016

(51) Int. Cl.
*G06F 3/0481* (2013.01)
*G06F 3/0488* (2013.01)
(Continued)

(52) U.S. Cl.
CPC ........ *G06F 3/04817* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS

| 7,017,118 B1 * | 3/2006 | Carroll ................. G06F 3/0481 345/160 |
| 2005/0179647 A1 * | 8/2005 | Simmons ............... G06F 3/023 345/156 |

(Continued)

OTHER PUBLICATIONS

Authors: Chris Wilson and Paul Kinland. Title: Touch and Mouse Together Again for the First Time. Publication Date: Mar. 13, 2013. Publisher: Html5rocks. URL: https://www.html5rocks.com/en/mobile/touchandmouse/.*

(Continued)

*Primary Examiner* — Daniel Samwel
*Assistant Examiner* — David V Luu

(57) ABSTRACT

Techniques involving control of interaction with an application launcher are described. In one or more implementations, interaction with a plurality of representations of applications or content in an application launcher is controlled by a computing device. The plurality of representations are selectable to navigate to a user interface corresponding with a respective said application or content. The controlling includes detection of which of a plurality of types of interaction are used by a user in relation to the application launcher. Responsive to the detection that a gesture type of interaction is used, a manage mode is entered in which customization or commands of the representations are initiated using gestures that are not usable to initiate the customization or commands outside the manage mode. Responsive to detection that a cursor or keyboard type of interaction is used, the customization or the commands of the representations is enabled using a cursor control device or keyboard, respectively, without entering the manage mode.

16 Claims, 26 Drawing Sheets

(51) Int. Cl.
   *G06F 3/0482* (2013.01)
   *G06F 3/0484* (2013.01)

(52) U.S. Cl.
   CPC ...... *G06F 3/04812* (2013.01); *G06F 3/04847* (2013.01); *G06F 3/04886* (2013.01); *G06F 2203/0381* (2013.01)

(56) References Cited

U.S. PATENT DOCUMENTS

| | | | | |
|---|---|---|---|---|
| 2006/0107231 A1* | 5/2006 | Matthews | ............. | G06F 3/0481 715/788 |
| 2012/0036475 A1* | 2/2012 | Yoshitomi | ............. | G06F 3/0482 715/810 |
| 2014/0368421 A1* | 12/2014 | Smus | ...................... | G06F 3/038 345/156 |

OTHER PUBLICATIONS

"Gesture List for the Touch and Mouse Pointer Input modes for the Remote Desktop Apps", Retrieved from <<https://blogs.msdn.microsoft.com/rds/2014/10/02/gesture-list-for-the-touch-and-mouse-pointer-input-modes-for-the-remote-desktop-apps/>>, Oct. 2, 2014, 6 Pages.

"Personalize your PC—Microsoft Windows (8.1)", Retrieved from <<http://web.archive.org/web/20131221055609/http://windows.microsoft.com/en-us/windows-8/personalize-pc-tutorial>>, Dec. 21, 2013, 7 Pages.

"International Search Report and Written Opinion Issued in PCT Application No. PCT/US2016/013307" (foreign counterpart to U.S. Appl. No. 14/599,895), dated May 3, 2016, 11 Pages.

PCT Application No. PCT/US2016/013307 (foreign counterpart to U.S. Appl. No. 14/599,895), PCT Demand, Article 34 Response and Amendments, Date: Jun. 14, 2016, 14 Pages.

"Second Written Opinion Issued in PCT Application No. PCT/US2016/013307", dated Dec. 16, 2016, 6 Pages.

"Office Action Issued in European Patent Application No. 16701897.7", dated Aug. 25, 2017, 2 Pages.

"Response to Office Action Issued in European Patent Application No. 16701897.7", dated Oct. 11, 2017, 4 Pages.

"International Preliminary Report on Patentability Issued in PCT Application No. PCT/US2016/013307", dated Apr. 19, 2017, 7 Pages.

* cited by examiner

CONTROL OF REPRESENTATION INTERACTION WITHIN AN APPLICATION LAUNCHER

BACKGROUND

The amount of applications with which a user may interact is ever increasing. For example, users traditionally shopped at "bricks and mortar" stores to purchase applications that were then loaded locally on the users' computing devices. With the advent of online application stores, the availability of applications to the user has continued to increase such that a user may include tens and even hundreds of different applications on a variety of different computing devices.

As such, techniques have been developed to aid a user in organizing access to these applications. One such technique is known as an application launcher, such as a start screen, start menu, and so on. The application launcher includes representations of applications or content (e.g., tiles, icons, and so on) that are selectable to launch execution and access to the represented applications or content.

Conventional techniques that are utilized to manage application launchers, however, could be inefficient and lack intuitiveness especially when confronted by the multitude of applications that even a casual user may include on a computing device. One such example includes techniques used to support interaction with the application launcher. For example, the application launcher may support interaction with a variety of different input types, such as via a cursor (e.g., mouse), keyboard, and gesture, e.g., touch. Conventional techniques, however, involve a single experience that is used for all of these input types, which results in compromises that limit user efficiency and intuitiveness.

SUMMARY

Techniques involving control of interaction with an application launcher are described. In one or more implementations, interaction with a plurality of representations of applications or content in an application launcher is controlled by a computing device. The plurality of representations are selectable to navigate to a user interface corresponding with a respective said application or content. The controlling includes detection of which of a plurality of types of interaction are used by a user in relation to the application launcher. Responsive to the detection that a gesture type of interaction is used, a manage mode is entered in which customization or commands of the representations is initiated using gestures that are not usable to initiate the customization or commands outside the manage mode. Responsive to detection that a cursor or keyboard type of interaction is used, the customization or the commands of the representations is enabled using a cursor control device or keyboard, respectively, without entering the manage mode.

In one or more implementations, a computing device includes a processing system configured to execute one or more instructions and one or more computer-readable storage media having the one or more instructions stored thereon that, responsive to execution by the processing system, causes the processing system to control interaction with a plurality of representations of applications or content in an application launcher. The plurality of representations are selectable to navigate to a user interface corresponding with a respective application or content. The control is configured to output a context menu responsive to a gesture-type interaction in relation to respective ones of the plurality of representations having access to one or more commands that is different than a context menu output in relation to the respective ones of the plurality of representations that is output in response to a cursor-type or keyboard-type interaction.

In one or more implementations, a computing device includes a processing system configured to execute one or more instructions and one or more computer-readable storage media having the one or more instructions stored thereon that maintain an operating system configured to perform operations involving control of interaction with a plurality of representations of applications or content in an application launcher. The operations includes responsive to detection that a gesture type of interaction is used in relation to the application launcher to perform a customization, entering a manage mode in which customization of the representations is initiated using gestures that are not usable to initiate the customization outside the manage mode. The operations also include responsive to detection that a non-gesture type of interaction is used in relation to the application launcher to perform a customization, enabling the customization of the representations using a cursor control device or keyboard, respectively, without entering the manage mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
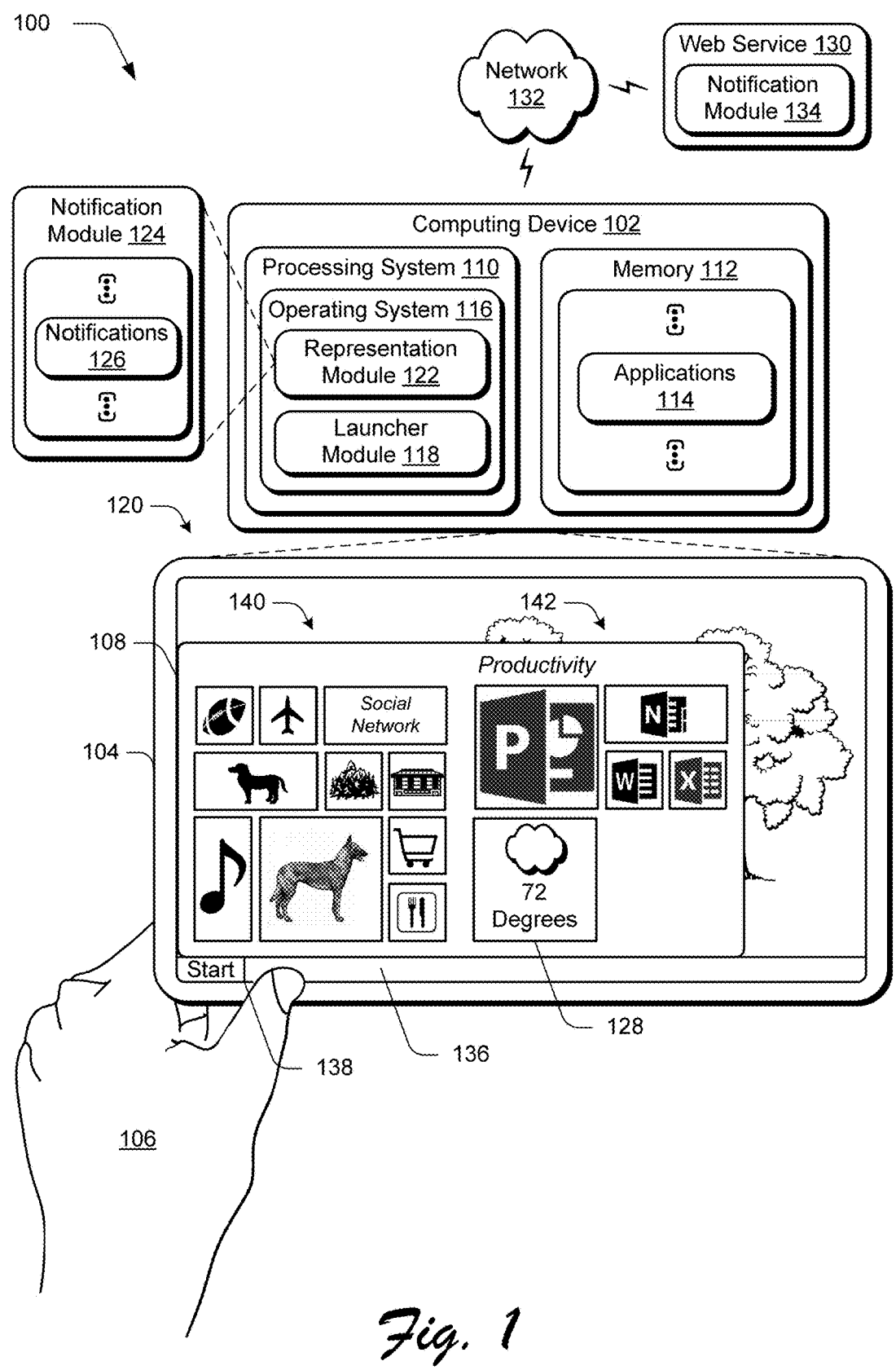
FIG. 1 depicts an environment in an example implementation that is configured to perform application launcher techniques described herein.

Application launchers have been developed to assist a user in locating an application of interest, such as to launch a particular word processing program, browser, access a document, picture, music or other content, and so on. However, conventional techniques supported a single experience to access the application launcher, even though the application launcher supports a variety of different interaction techniques, such as cursor (e.g., mouse), keyboard, and touch centric techniques. As such, these conventional techniques made compromises that resulted in inefficiencies in the user experience, making it feel fragmented.

Techniques involving control of interaction with an application launcher are described. In one or more implementations, a user experience with an application launcher of a computing device is controlled such that actions taken by a user are optimized for different input types without compromising the user experience or making it feel fragmented. This includes treating each of a plurality of input types (e.g., cursor, keyboard, gesture, and so on) as a primary means by which a user interacts with the application launcher.

For example, users can access the application launcher and representations of applications and content using gestures (e.g., touch or a natural user interface with which interaction is captured with a camera) by entering a manage mode. To enter the manage mode via a gesture, a user may presses/hold a representation of an application or content within the application launcher. When in this mode, users select representations or groups of representations in a variety of ways, such as by tapping on a group header or a representation, e.g., icon or tile. The user may then move the representations or groups of representations as desired. Commands related to a respective representation are also selectable in this mode, such as to cause output of a context menu having one or more commands related to the representation. When done, the user may exit the manage mode. In this way, the manage mode supports an optimal experience for gestures, e.g., touch inputs. Otherwise, in conventional techniques users are required to press and hold on each element before trying to move the item, since a simple tap gesture would conflict with trying to launch/activate the item, and a drag would conflict with trying to scroll or pan the user interface.

For cursor and keyboard use, however, the manage mode may be avoided because it creates the additional steps of entering and exiting the mode. Thus, the user's experience is optimized by removing the need for this mode for these input types. However, in order to support consistency between the experience similar visuals may be used for cursor and keyboard with that of the manage mode, e.g., shrinking of representations, use of similar animations, fading of representations, movement of the representations (e.g., wiggling), and so on. Further discussion of these and other features are described in the following sections and shown in corresponding figures.

In the following discussion, an example environment is first described that may employ the application launcher techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the application launcher techniques described herein. The illustrated environment 100 includes an example of a computing device 102, which is illustrated as a mobile computing device (e.g., tablet or mobile phone) having a housing 104 that is configured to be held by one or more hands 106 of a user. A variety of other configurations of the computing device 102 are also contemplated.

Figure 28:
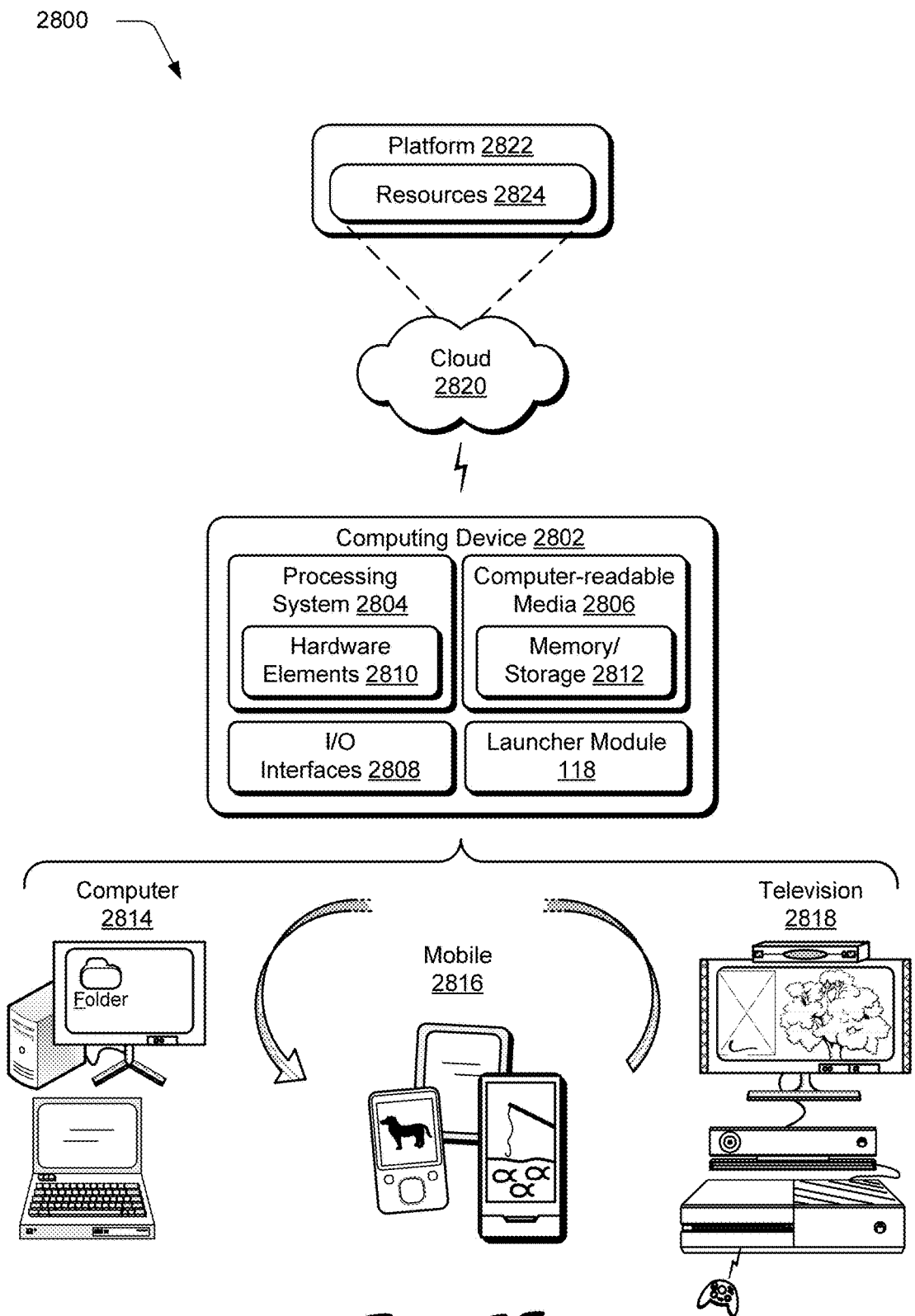
FIG. 28 illustrates various components of an example device that can be implemented as any type of computing device as described with reference to FIGS. 1-7 to implement embodiments of the techniques described herein.

For example, the computing device 102 may be configured as a traditional computer (e.g., a desktop personal computer, laptop computer, and so on), a mobile station, an entertainment appliance, a wireless phone, a tablet, a netbook, and so forth as further described in relation to FIG. 28. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a display device 108, a processing system 110, and an example of computer-readable storage media, which in this instance is memory 112. The memory 112 is configured to maintain applications 114 that are executable by the processing system 110 to perform one or more operations.

The processing system 110 is not limited by the materials from which it is formed or the processing mechanisms employed therein. For example, the processing system 110 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of or for processing system 110, and thus of or for a computing device, may include, but are not limited to, quantum computing, optical computing, mechanical computing (e.g., using nanotechnology), and so forth. Additionally, although a single memory 112 is shown, a wide variety of types and combinations of memory may be employed, such as random access memory (RAM), hard disk memory, removable medium memory, and other types of computer-readable storage media.

The computing device 102 is further illustrated as including an operating system 116. The operating system 116 is configured to abstract underlying functionality of the computing device 102 to applications 114 that are executable on the computing device 102. For example, the operating system 116 may abstract the processing system 110, memory 112, network, input/output, and/or display functionality of the display device 108, and so on such that the applications 114 may be written without knowing "how" this underlying functionality is implemented. The application 114, for instance, may provide data to the operating system 116 to be rendered and displayed by the display device 104 without understanding how this rendering will be performed. The operating system 116 may also represent a variety of other functionality, such as to manage a file system and user interface that is navigable by a user of the computing device 102.

The operating system 116 may be configured to process a variety of different input/output functionality supported by the computing device 102. Thus, the operating system 116 include functionality relating to recognition of inputs and/or provision of outputs by the computing device 102 as well as devices used to detect those inputs. For example, the operating system 116 may be configured to identify gestures and cause operations to be performed that correspond to the gestures, and so on. The inputs may be detected for processing by the operating system 110 in a variety of different ways.

For example, the operating system 110 may be configured to receive one or more inputs via touch interaction with a hardware device, e.g., fingers of the user's hand 106 detected using touchscreen functionality of the display device 108. Recognition of the touch inputs may be leveraged by the operating system 116 to interact with a user interface output by the computing device 102, such as to interact with a game, an application, browse the internet, change one or more settings of the computing device 102, and so forth. A variety of other hardware devices are also contemplated that do not involve touch interaction with the display device 104. Examples of such hardware devices include a cursor control device (e.g., a mouse), a remote control (e.g. a television remote control), a mobile communication device (e.g., a wireless phone configured to control one or more operations of the computing device 102), and other devices.

The operating system 116 may also represent a variety of other functionality, such as to manage a file system and a user interface that is navigable by a user of the computing device 102. An example of this is illustrated as a launcher module 118 that is representative of functionality to implement an application launcher (e.g., start screen or start menu), an example of which is illustrated as a start menu but other configurations are also contemplated, such as a start screen that consumes a majority of a display area of the display device through inclusion of representation directly "on" the user interface, e.g., on a desktop.

The application launcher 120 includes representations of a plurality of the applications 114 or content, such as icon, tiles, textual descriptions, and so on, and may be configured in a variety of ways. The application launcher 120, for instance, may be configured as a root level of a hierarchical file structure, e.g., each of the other levels are "beneath" the root level in the hierarchy. The representations shown in the illustrated example are selectable to launch a corresponding one of applications 114 for execution on the computing device 102. In this way, a user may readily navigate through a file structure and initiate execution of applications 114 of interest. Other configurations are also contemplated, examples of which are discussed in the following and shown in corresponding figures.

The operating system 116 is also illustrated as including a representation module 122. The representation module 122 is representative of functionality to manage representations of applications 114 (e.g., tiles, icons, and so on) and content consumable by the applications 114, examples of which are illustrated for the start menu. In some instance, the representations may include notifications that may be displayed as part of the representations without launching the represented applications 114. This functionality is illustrated as a notification module 124 that is configured to manage notifications 126 for inclusion as part of the representations.

For example, a representation 128 of a weather application is illustrated as including a notification that indicates a name and current weather conditions, e.g., "72°." In this way, a user may readily view information relating to the applications 114 without having to launch and navigate through each of the applications. Although representations of specific applications 114 are shown, other representations of applications are also contemplated, such as a representation of an application that references a user's involvement with a service, e.g., a friend in a social network service.

In one or more implementations, the notifications 126 may be managed without executing the corresponding applications 114. For example, the notification module 124 may receive the notifications 126 from a variety of different sources, such as from software (e.g., other applications executed by the computing device 102), from a web service 130 via a network 132, and so on. This may be performed responsive to registration of the applications 114 with a notification module 134 to specify where and how notifications are to be received. The notification module 124 may then manage how the notifications 126 are displayed as part of the representations without executing the applications 114. This may be used to improve battery life and performance of the computing device 102 by not running each of the applications 114 to output the notifications 126.

Although this discussion described incorporation of the notification module 124 at the client, functionality of the notification module 124 may be implemented in a variety of ways. For example, functionality of a notification module 124 may be incorporated by the web service 130 in whole or in part. The notification module 134, for instance, may process notifications received from other web services and manage the notifications for distribution to the computing device 102 over the network 132, e.g., through registration of the applications 114 with the notification modules 124, 134 such that the notifications 126 may be output as part of the representations without execution the represented applications 114.

Output of the application launcher 120 may be initiated in a variety of ways. In the illustrated example, for instance, a taskbar 136 (e.g., a quick launch bar) is displayed along an edge of a user interface display on the display device 108. The taskbar 136 includes representations of functionality, including a representation 138 of the application launcher 120, e.g., "start." Selection of the representation 138 of the application launcher 120 causes the launcher module 118 to display the application launcher 120 in the user interface. The taskbar 136 may also be configured to include representations of applications 114 that are currently being executed (e.g., whether actively or in a sleep state) by the computing device 102.

In the illustrated example, techniques are employed to group representations, which may be utilized to organize the representations, which may be performed automatically by the launcher module 118 and/or manually by a user. The application launcher 120 of FIG. 1, for instance, includes first and second groups 140, 142 of representations. In one or more implementations, the groups 140, 142 are visually differentiated from each other, such as through use of a display characteristic (e.g., color, shading), a spacing between the representations within the plurality of groups is less that a spacing between the groups as a whole as illustrated, and so forth. In the illustrated example, group 142 is associated with a name for the group, which may be specified manually by a user, automatically by the launcher module 118 and/or applications represented in the group (e.g., as part of installation of a suite of applications), and so forth.

As previously described, conventional techniques supported a single experience to interact with the application launcher, even though the application launcher may support use of a variety of different techniques, such as cursor (e.g., mouse), keyboard, and gesture techniques, e.g., touch and natural user interfaces. As such, these conventional techniques made compromises that resulted in inefficiencies in the user experience, making it feel fragmented.

In one or more implementations, a user experience with the application launcher 120 of the computing device 102 is controlled such that actions taken by a user are optimized for different input types without compromising the user experience or making it feel fragmented. This includes treating each of a plurality of input types (e.g., cursor, keyboard, gesture, and so on) as a primary technique by which a user interacts with the application launcher 120. These techniques include movement of a representation of group of representations, invocation of a command associated with the representation, naming of a representation or group, and so on, further discussion of which is described in corresponding sections and shown in related figures.

Movement of a Representation or Group of Representations

Figure 2:
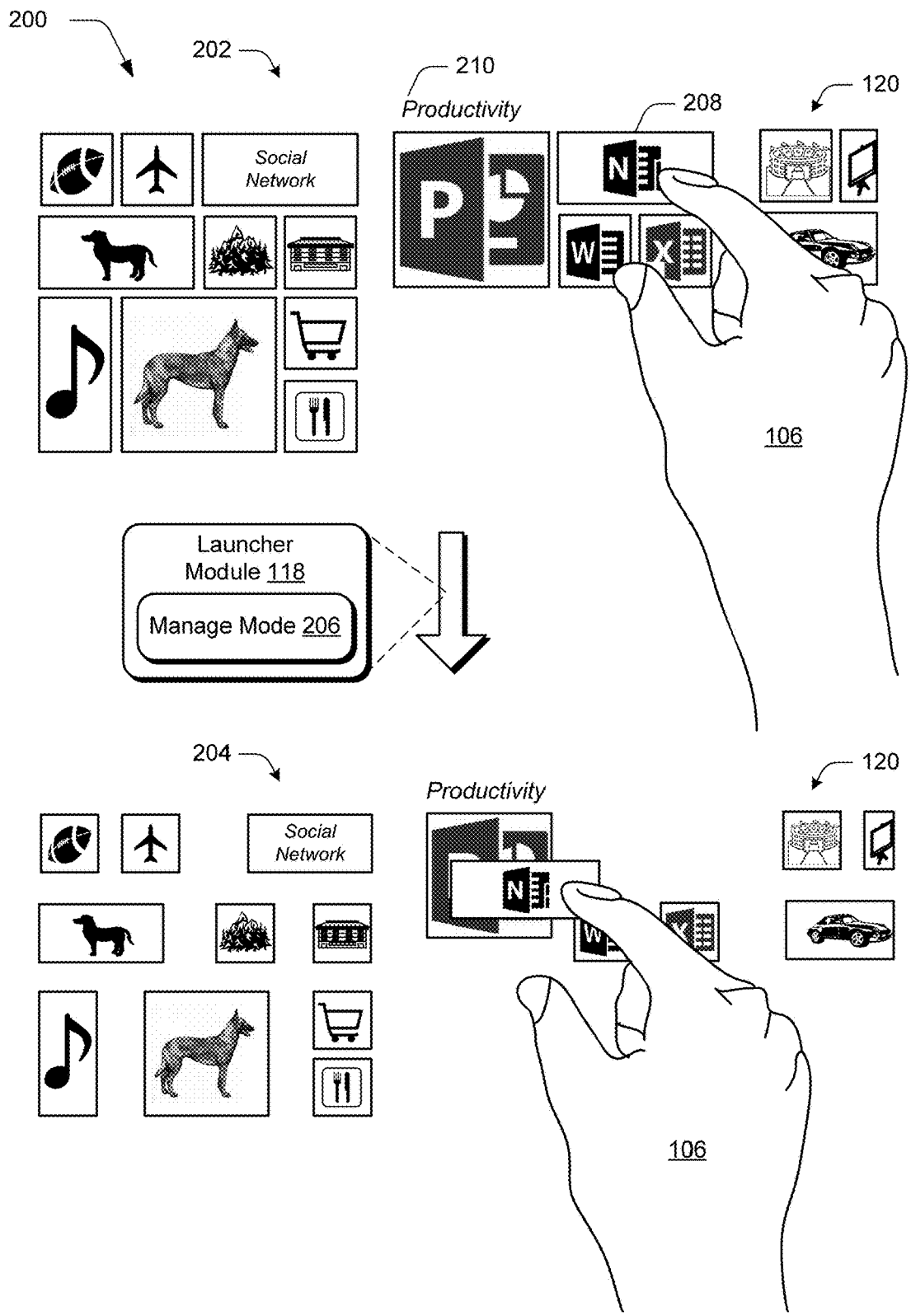
FIG. 2 depicts a system in an example implementation in which a manage mode is entered to support movement of representations and groups of representations within an application launcher of FIG. 1.

FIG. 2 depicts a system 200 in an example implementation in which a manage mode is entered using a gesture to support movement of representations and groups of representations within an application launcher 120 of FIG. 1. This system 200 is illustrated using first and second stages 202, 204. At the first stage 202, a user initiates entry into a manage mode 206 of the launcher module 118. Entry into the manage module 206 is performable in a variety of ways, such as to detect proximity of a finger of the user's hand 106 or other object to a representation 208 or header 210 over a threshold amount of time. For example, a user may "press and hold" a representation 208, e.g., a tile in this example, to enter the manage mode 206.

An example of entry into the manage mode 206 is shown at the second stage 204. Once entered, display characteristics of the application launcher 120 are changed. In this example, this includes a reduction in display size of the representations and an increase in size of gaps disposed between the representations. In this way, efficiency of user selection using a gesture is increased. Once in this mode, the user may tap on the representation to be moved if different that the one initially selected to enter the manage mode 206 to move it where desired, such as to drag a representation or group of representations to a desired location.

Alternatively, instead of first tapping on a representation 208 or header 210 to select it and then moving it, the user can also briefly position a finger or other object over the representation or header, and then start moving the representation without removing the finger from contact with a surface of the display device 108. When a representation is released at another location, it remains selected. In one or more implementations, headers 210 (e.g., "Productivity" in the illustrated example) become unselected when dropped.

Figure 3:
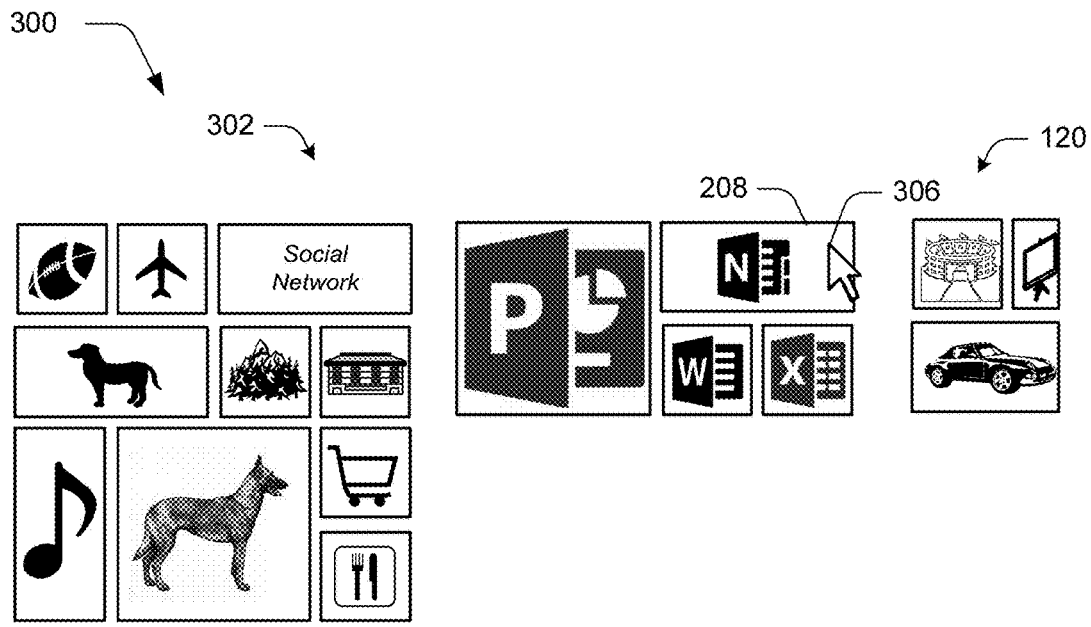
FIG. 3 depicts a system in an example implementation in which movement of representations and groups of representations within an application launcher of FIG. 1 using a cursor control device is shown.
Figure 3:
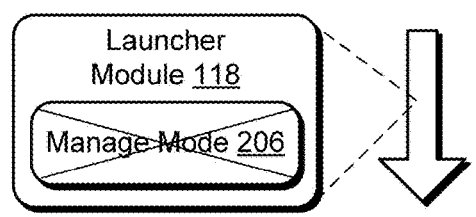
Figure 3:
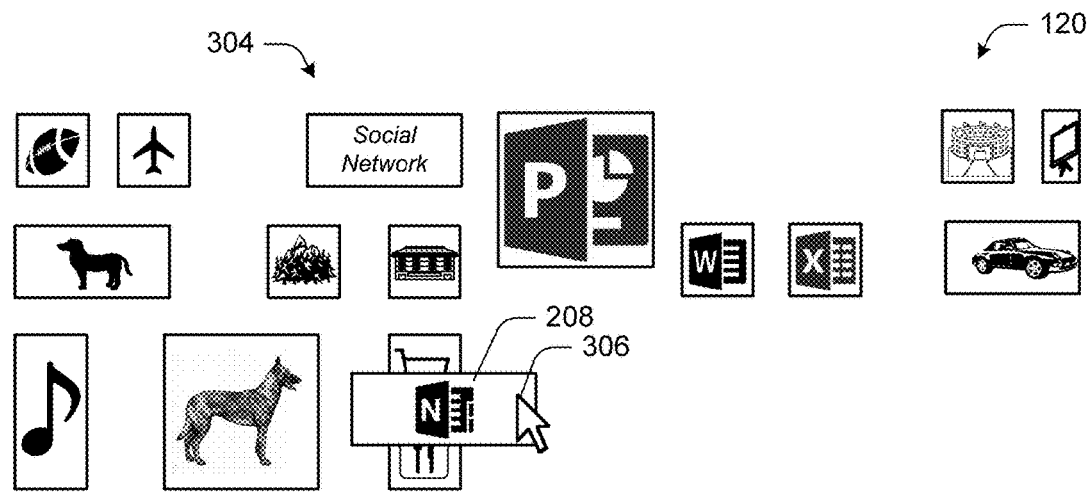

FIG. 3 depicts a system 300 in an example implementation in which movement of representations and groups of representations within an application launcher 120 of FIG. 1 using a cursor control device is shown. This system 300 is also illustrated using first and second stages 302, 304. As previously described, the manage mode 206 is not entered when employing a cursor (e.g., a cursor control device such as a mouse, trackpad, trackball, and so on) or using a keyboard.

Instead, a user selects a header or the representation using a cursor 306 as shown in the first stage 302 and drags it to a described location as shown at the second stage 304, e.g., via a left-click and drag using a mouse. The launcher module 118 is configured to distinguish whether the user is trying to perform a drag or simply trying to select on the representation 208 or header of the group, e.g., through detection of movement that exceeds a predefined threshold.

As the representation 208 is moved, the launcher module 118 employs the same visuals in the second stage 304 as employed for the manage module 206 as illustrated for the second stage 204 of FIG. 2. In this way, a user experience in the manage mode 206 using gestures is connected with a user experience used to support interaction using a cursor. In addition, the visuals make it easier to rearrange representations and groups because the gutters between the representations are enlarged as previously described in this example.

The manage mode 206 visuals are automatically taken away when the user finishes the rearrange, e.g., by releasing the left-button of the mouse and thus signifying completion of the rearrange operation.

Similar techniques are usable to support interaction via a keyboard. With a keyboard, for instance, users also stay outside of the manage mode 206. Rather, the users navigate to the representation 208 or header 210 of a group that is to be moved (e.g., by "tabbing" to a desired representation) and use arrow keys to move the representation or group, e.g., while holding down "alt" and "shift" keys. Once again, the causes output of the manage mode 206 visuals as the object is being moved without actually entering the manage mode. The visuals are removed once the representation 208 or header 210 has been released.

Figure 4:
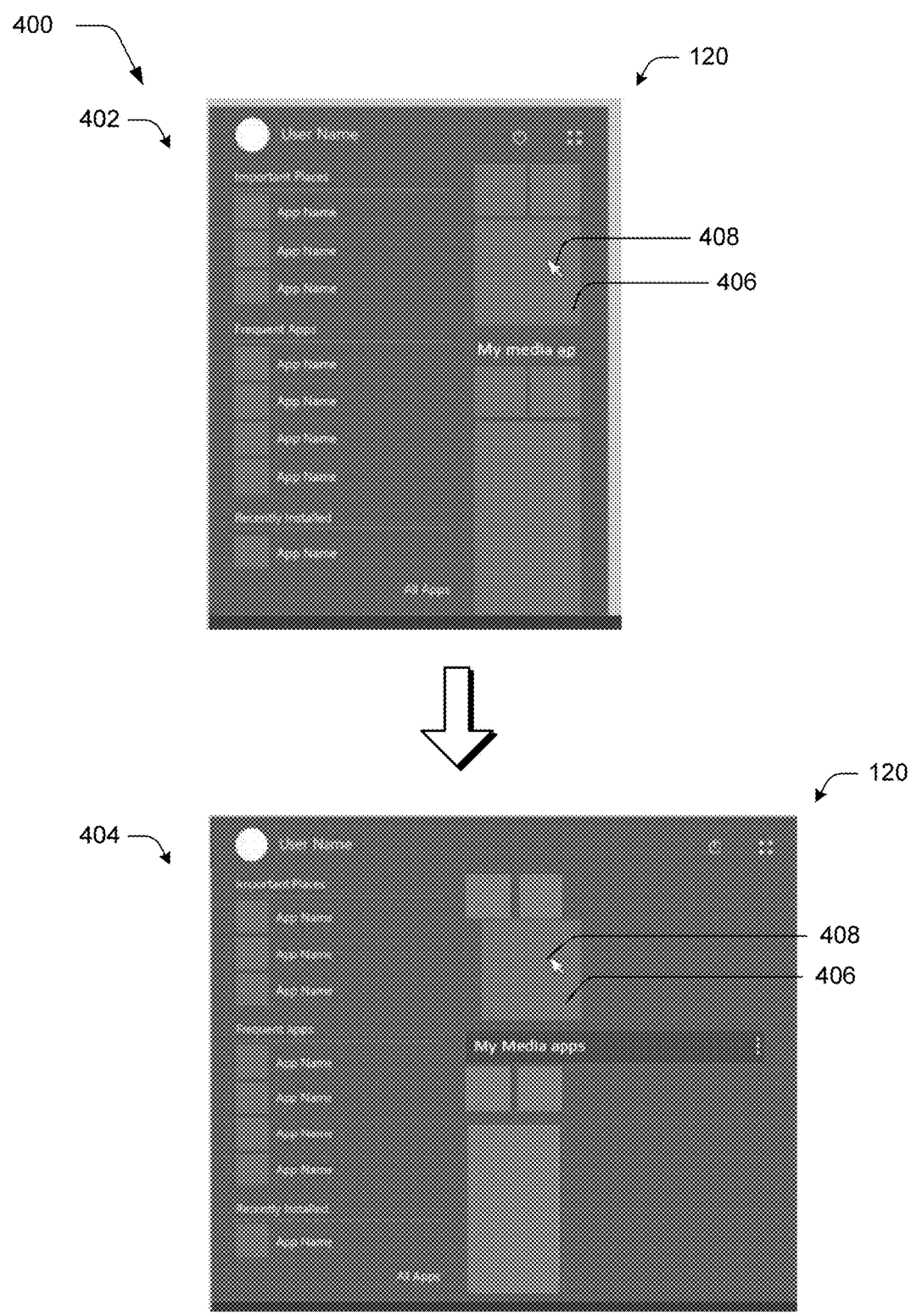
FIG. 4 depicts a beginning of another example implementation in which movement of representations and groups of representations within an application launcher of FIG. 1 using a cursor control device is shown.

FIG. 4 depicts a beginning of another example implementation 400 in which movement of representations within an application launcher 120 of FIG. 1 using a cursor control device is shown. This implementation 400 is illustrated using first and second stages 402, 404. At the first stage 120, a user selects a representation 406 using a cursor 408 controlled by a cursor control device, e.g., a mouse or trackpad. The user, for instance, selects and initiates a movement of the cursor 406 in an amount over a predefined threshold, which is recognized by the launcher module 118 as a desire to move the representation 406.

In response, the launcher module 118 expands a display area consumed by the application launcher to its full size, e.g., by expanding the width as shown at the second stage 404. In this way, the application launcher 120 consumes a reduced display area when configured to support launching of represented applications or content and is expanded by the launcher module 118 to support modifications to layouts or other characteristics of the application launcher 120. Further, as should be noted movement of the representation by the cursor technique is initiated and performed without entering into the manage mode 206 of FIG. 2.

Figure 5:
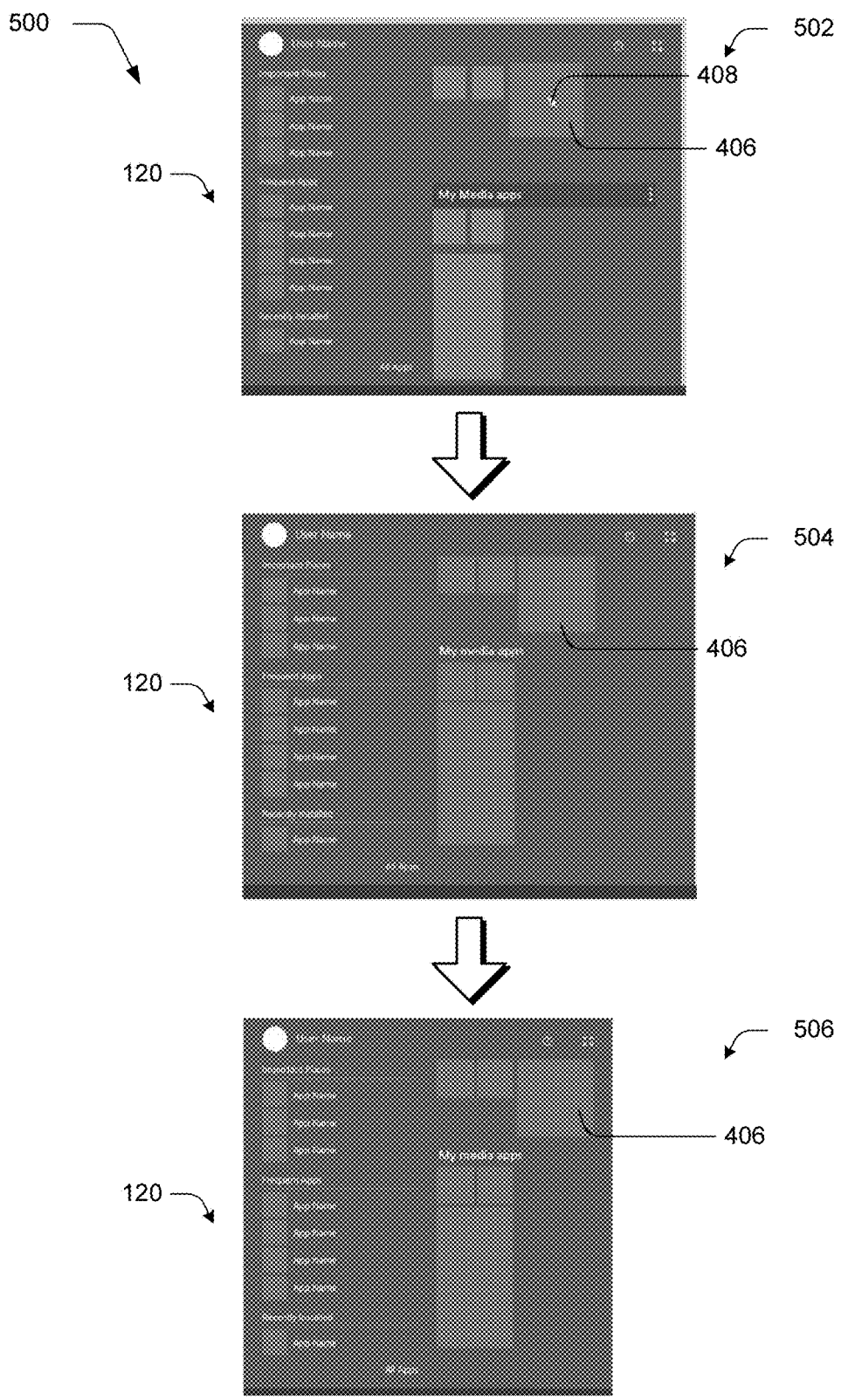
FIG. 5 depicts continuation of an example implementation started at FIG. 4 in which movement of representations and groups of representations within an application launcher of FIG. 1 using a cursor control device is shown.

FIG. 5 depicts continuation of an example implementation 500 started at FIG. 4 in which movement of representations within an application launcher 120 of FIG. 1 using a cursor control device is shown. This implementation 500 is illustrated using first, second, and third stages 502, 504, 506. At the first stage 502, the cursor 406 is used to position the representation 408 at a desired location.

At the second stage 504, the input controlling movement ceases (e.g., a left button of a mouse is released, a finger is lifted from a track pad, and so on) which commits the change to the application launcher 120. This causes the launcher module 118 to cease output of the visuals associated with the manage mode 206, e.g., sizing of representations and spacing between the representations. However, a size of the application launcher 120 remains the same, e.g., in its expanded or "full" state. In this way, a user may efficiently select other representations or headers while still accessing the application launcher 120 without alternating between expanded and collapsed display states. When causing output of the application launcher 120 at a subsequent time, however, the application launcher 120 is displayed in a reduced/collapsed state and thus conserves display area of the display device 108.

Figure 6:
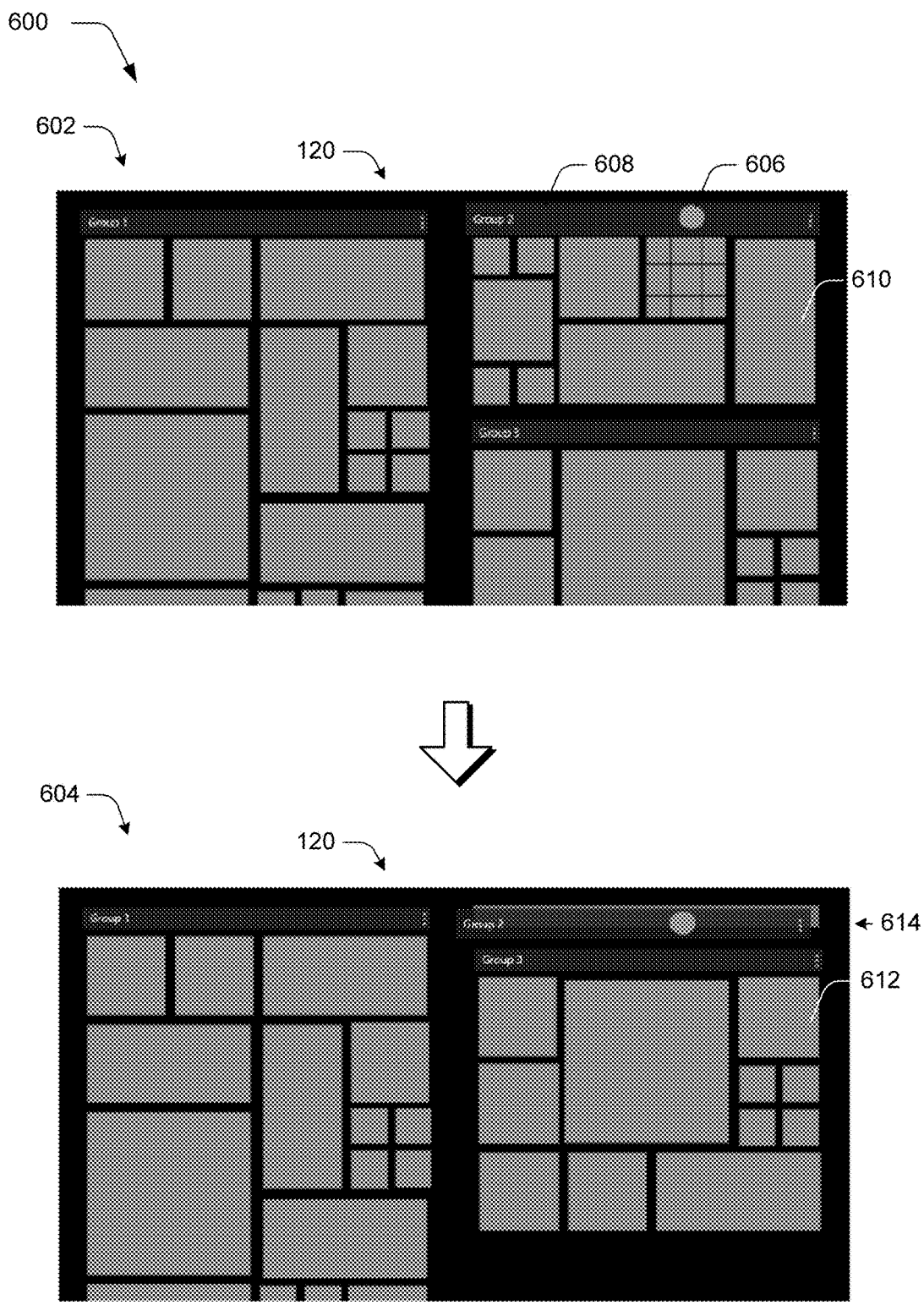
FIG. 6 depicts a beginning of another example implementation in which movement of groups of representations within an application launcher of FIG. 1 using gestures in a manage mode is shown.

FIG. 6 depicts a beginning of another example implementation 600 in which movement of groups of representations within an application launcher of FIG. 1 using gestures in a manage mode 206 is shown. This example implementation 600 is shown using first and second stages 602, 604.

At the first stage 602, a gesture 606 is input to move a header 608 of a group 610. This is performable in a variety of ways. For example, a gesture involving a touch input may be detected involving placement of a finger of a user's hand 106 on the header 608 of a group along with subsequent movement over a predefined threshold to cause entry into the manage mode 206. This is performable through selection of any part of the header 608 in this example.

In another example, the application launcher 120 is already in the manage mode 206 and thus a user presses and pauses on the header 608 that is not yet selected (e.g., without lifting of a finger of the user's hand 106) inside the manage mode 206 and starts moving the header 608. This is also performable through selection of any part of the header 608 in this example. A variety of other examples are also contemplated, such as through use of an edit box as described in greater detail relation to FIG. 9 below.

Regardless of how selected, at the second stage 604 an animation is utilized by the launcher module 118 to cause the group 610 to be collapsed such that just the header 608 is displayed and a group 612 displayed adjacent (e.g., below) the group 610 is moved to fill the space. In this way, a display area of the application launcher 120 is conserved to support efficient rearrangement of the groups. Through comparison with the first stage 602 of FIG. 6, it should be noted that the header 608 has grown in size in an amount of display area consumed by the header to indicate that a user has paused long enough to be able to move the group 610. Also, an indicator 614 is created to indicate where the group 610 would be located if the gesture is completed, e.g., a finger of the user's hand 106 is lifted from a surface of the display device 108.

Figure 7:
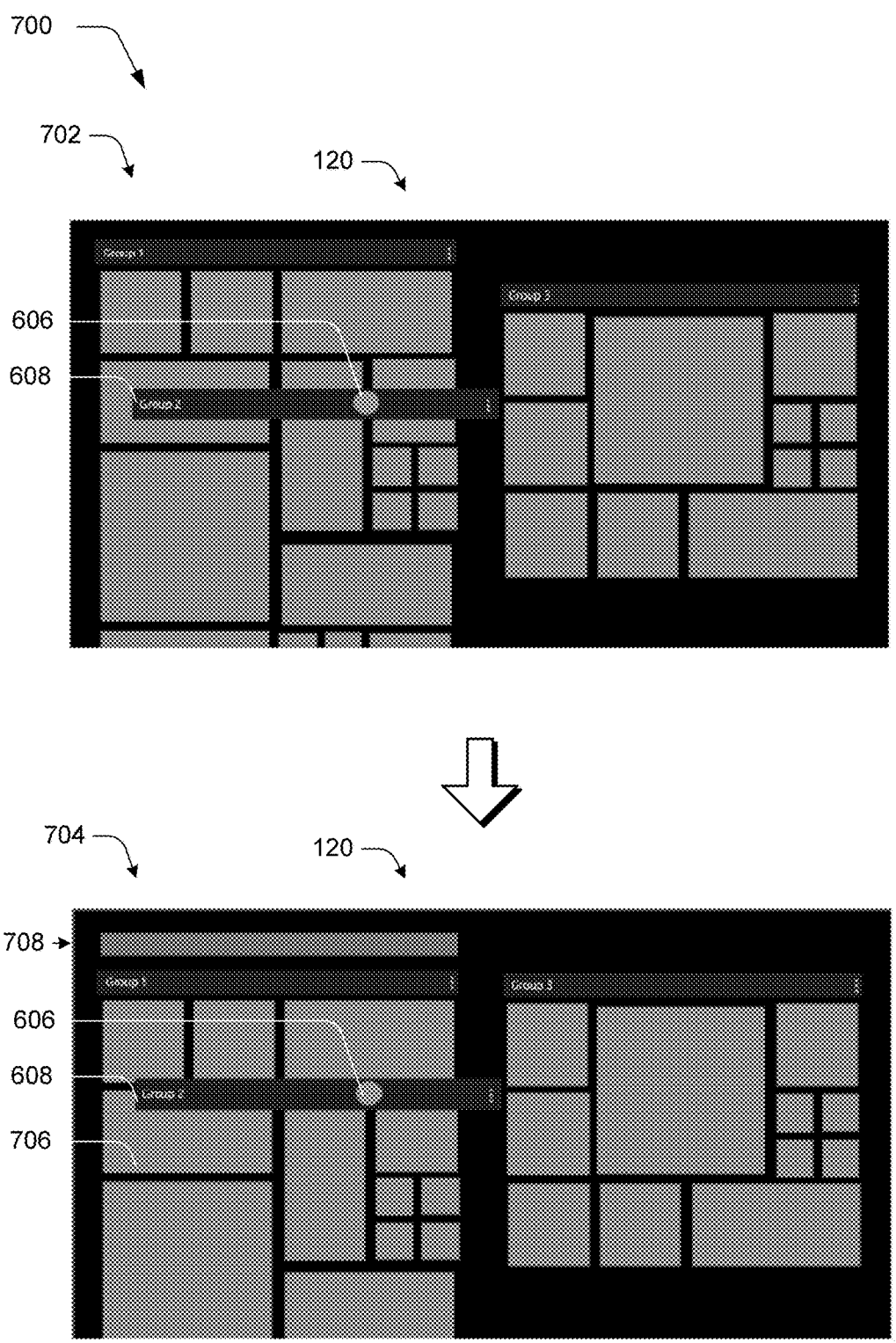
FIG. 7 depicts continuation of an example implementation started at FIG. 6 in which movement of groups of representations within an application launcher of FIG. 1 using gestures in a manage mode is shown.

FIG. 7 depicts an example implementation 700 that continues the example implementation 600 started at FIG. 6 in which movement of groups of representations within an application launcher 120 of FIG. 1 using gestures in a manage mode 206 is shown. This example implementation 700 is also shown using first and second stages 702, 704. At the first stage 702, the header 608 continues to be moved using the gesture 606. The group indicator 614 is removed responsive to a threshold amount of movement thereby indicating to the user that if the input is removed (i.e., the gesture is terminated) the header 608 and corresponding group 610 would not return to the original position.

If the header 608 remains positioned at a point during continuance of the gesture for a predefined amount of time (e.g., a live preview timer), space is created in the application launcher 120 using an animation to indicate where the group 610 is to be located if "let go." As shown at the second stage 704, for instance, the header 608 is positioned above a midpoint of group 706 (i.e., "Group 1" in the figure) which would cause group 610 to be positioned above group 706 in the application launcher 120. Thus, group 706 is moved down and a group indicator 708 is displayed to indicate where group 610 would be positioned upon termination of the gesture.

Figure 8:
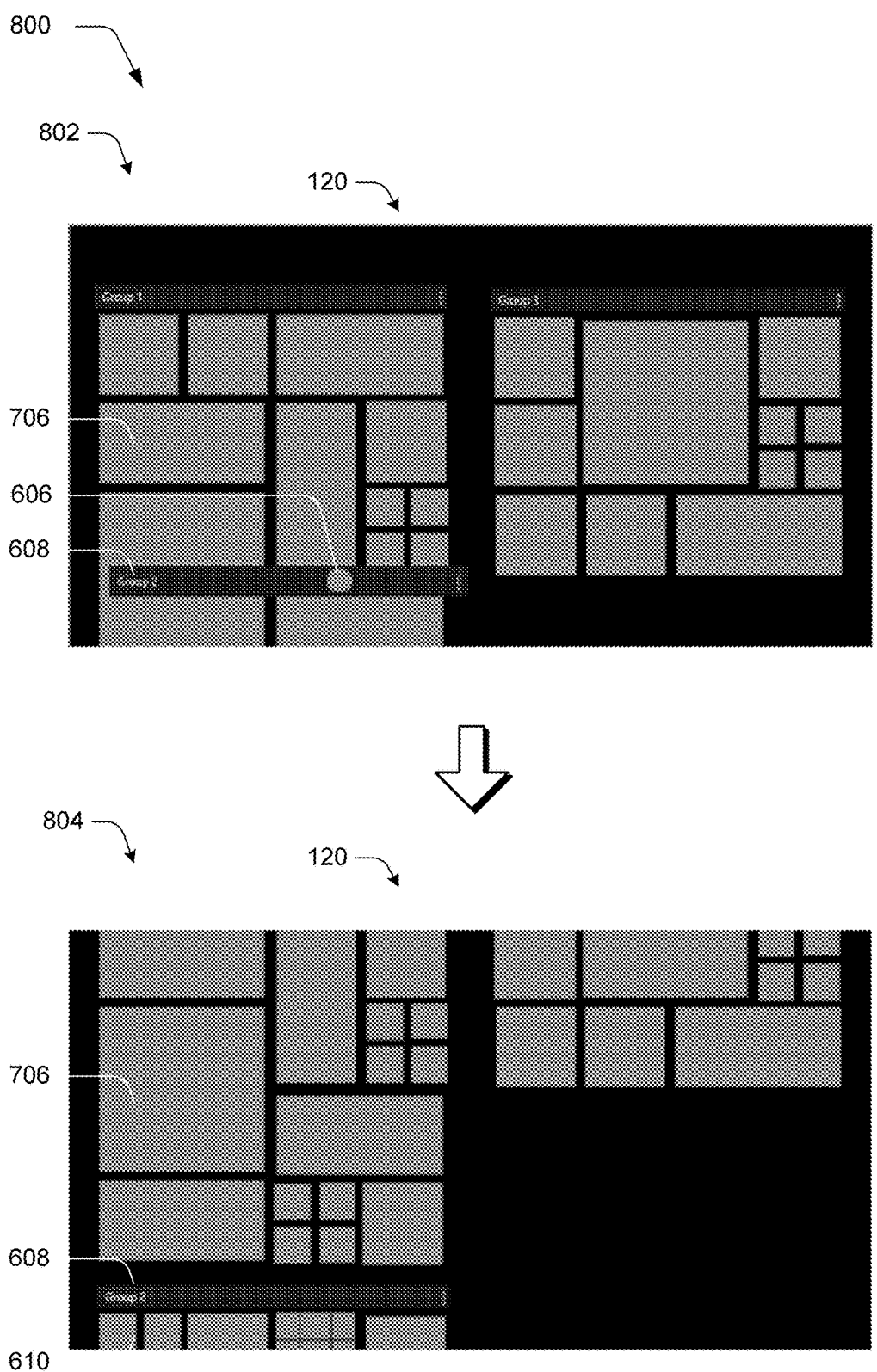
FIG. 8 depicts completion of an example implementation of FIG. 7 in which movement of groups of representations within an application launcher of FIG. 1 using gestures in a manage mode is shown.

FIG. 8 depicts an example implementation 800 that continues the example implementation 700 started at FIG. 7 in which movement of groups of representations within an application launcher of FIG. 1 using gestures in a manage mode 206 is shown. This example implementation 800 is also shown using first and second stages 802, 804. At the first stage 802, the gesture continues to move the header 608 downward in the application launcher 120 at a sufficient distance at which the indication 708 of the second stage 704 of FIG. 7 is removed, e.g., below a halfway point of the group 706. If the user ceases movement for a sufficient amount of time (e.g., as defined by a live preview timer as previously described), space is created after group 706, instead. Thus, space in the application launcher 120 above group 706 is collapsed and then groups in each linear arrangement of the groups (e.g., columns) are moved, e.g., shifted upward in this example. An indicator is then positioned below group 706, but as it is off screen in this example it is not currently displayed.

At the second stage 804, input of the gesture has ceased, e.g., a user has lifted a finger of the user's hand 106 away from the display device 108. In response, group 610 (i.e., Group 2) is expanded via an animation below group 706 (i.e., Group 1) in this example with additional space used for the indication of placement removed. Since an end of group 610 is not displayed (i.e., ends up off screen), an animation is used by the launcher module 118 to return back to display of the header 608 of group 610. It is also notable that the header 608 returns back to an original display size inside the manage mode 206 when the gesture is completed, such as to avoid display of an edit box upon finishing movement of the group 610.

Figure 9:
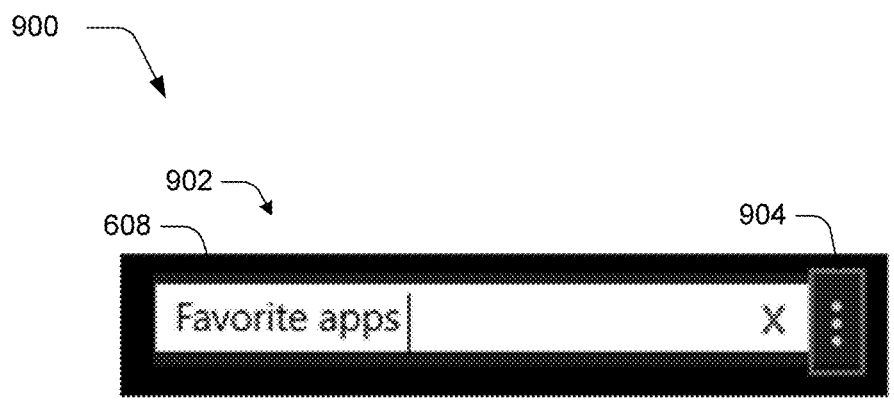
FIG. 9 depicts an example implementation of group movement of representations through use of an edit box.

FIG. 9 depicts an example implementation 900 of group movement of representations through use of an edit box 902. The edit box 902 is output responsive to an input to rename a group. In this example, the edit box 902 includes a portion 904 that supports user interaction via a gesture to move the header 608. A user, for instance, may place a finger of the user's hand 106 or other object on the portion 904 and then maintain contact to move the portion 904 and corresponding header 608 where desired.

A group may also be moved using a cursor controlled by a cursor control device in a variety of ways. For example, a user hovers over the header of a group, which causes output of group header visuals by the launcher module 118. The user then starts dragging the header, e.g., a left mouse button remains pressed along with movement involving the cursor control device. This can be done by dragging on any part of the header. As before, movement above a predefined threshold is first detected before the group is moved by the launcher module 118.

In another example, the user selects a header, e.g., by clicking on the group header, which makes the edit box 902 appear. At this point, the user can start moving the header by dragging on the portion 904 that supports user interaction as described above.

In one or more implementations, if the spacing above the top group is collapsed, then the user moves it by first selecting the header as described above. Then the user can move the group via the portion 904.

Group rearrange with mouse works similarly to that with touch since the user sees manage mode visuals as soon as the group is moved. Like with other rearrange operations involving the cursor, the user exits the manage mode 206 visuals as soon as the movement is completed. Also, the application launcher 120 may resize to its full size when the user starts dragging the header and thus employs similar behavior as described above for the gesture.

Invoking a Representation Command

Figure 10:
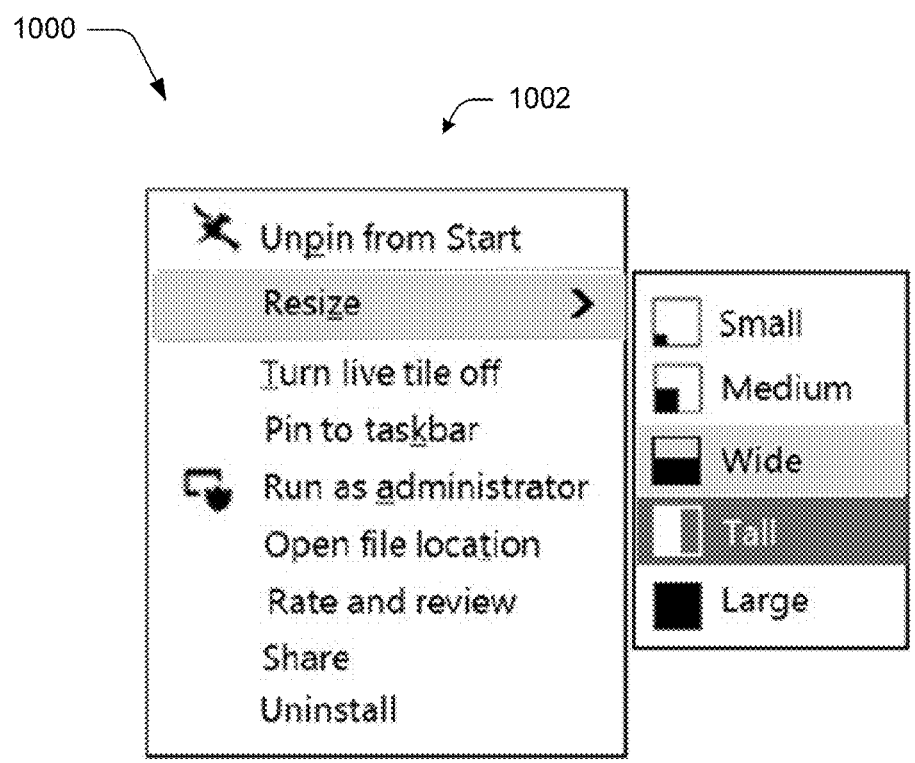
FIG. 10 depicts an example implementation of a context menu that is output in relation to a representation.

FIG. 10 depicts an example implementation 1000 of a context menu 1002 that is output in relation to a representation. Using a cursor control device, a user may select a representation (e.g., a right-click on a tile) to cause output of the context menu 1002. The context menu 1002 includes available commands (e.g., verbs) for the representation. When a user hovers a cursor over a command, e.g., resize in the illustrated example, corresponding commands of a submenu are shown if available, such as different resize options in this example. When a size is chosen, the representation is resized and the context menu 1002 is no longer displayed by the launcher module 118.

To access the context menu 1002 with a keyboard, a particular key combination is input (e.g., "shift" and "F10") to cause output of a context menu for a representation that currently has focus. Navigation through the commands in the context menu 1002 is then performed using arrows, first letters of the commands, and so on.

Figure 11:
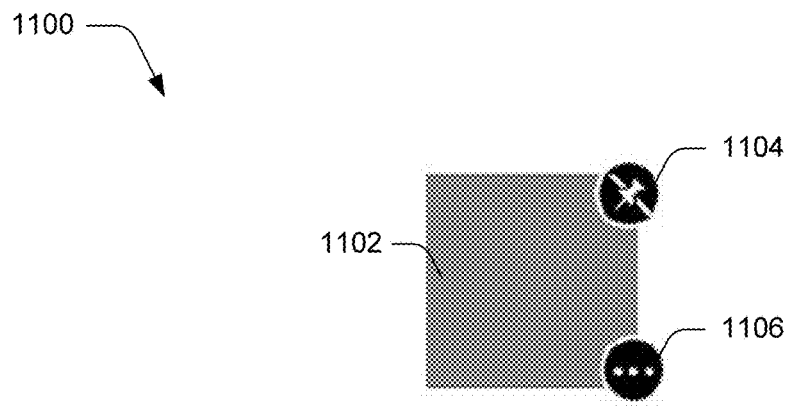
FIG. 11 depicts an example implementation involving access to the context menu of FIG. 10 using a gesture.

FIG. 11 depicts an example implementation 1100 involving access to the context menu 1002 of FIG. 10 using a gesture. To access the context menu 1002 via a gesture (e.g., a touch input), the gesture is differentiated from a gesture used to enter the manage mode 206. To reconcile this, the launcher module 118 causes entry into the manage mode 206 as described above, e.g., a touch and hold on the representation.

In response, the launcher module 118 causes output of options 1104, 1106 that are selectable by a user. A first one of the options 1104 is selectable to cause the representation 1102 to be removed from the application launcher 120. A second one of the options 1106 is selectable to "show more," which is a context menu in this example that includes additional commands besides the removal option.

Figure 12:
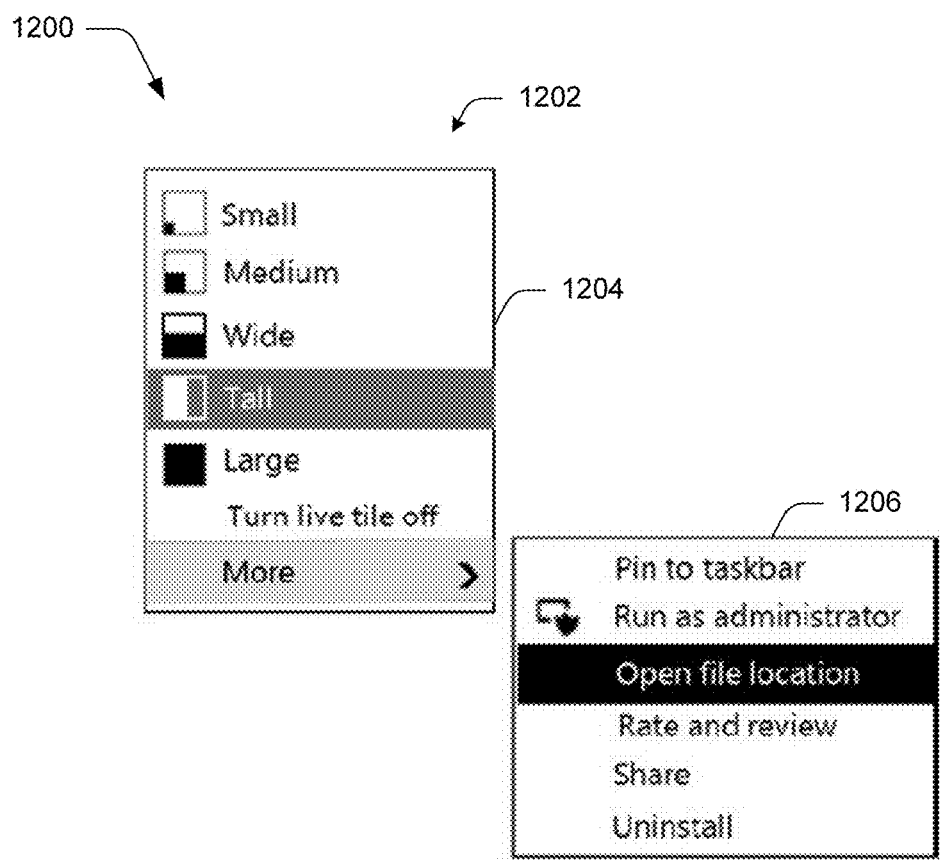
FIG. 12 depicts an example implementation showing output of a context menu responsive to a gesture input as described in relation to FIG. 11.

FIG. 12 depicts an example implementation 1200 showing output of a context menu 1202 responsive to a gesture input as described in relation to FIG. 11. In this example, the context menu 1202 output in the manage mode 206 as relating the gesture inputs is different than the context menu 1002 of FIG. 10 that is output for support of cursor and keyboard interactions.

For example, users may care more about managing a layout of the application launcher 102 than advanced keyboard and cursor operations such as "Run as Admin" or "Open File Location." Therefore, in order to optimize for gestures (e.g., touch), the context menu 1202 output to support interaction via gestures includes resize commands in a main menu 1204 and move non-customization related commands into a submenu 1206.

Selection of any of the commands in the context menu 1202 dismisses display of the menu. In one or more implementations, the launcher module 118 maintains the application launcher 120 in manage mode 206 when selecting on any of the following commands: unpin, any of the resize options, turn notifications on or off, uninstall, and add to or remove from the taskbar 136. The launcher module 118 exits out of manage mode 206 responsive to selection of other commands. A user may also light dismiss the context menu 1202 by making a selection (e.g., "clicking") outside the context menu 1202, which causes the launcher module 118 to keep the application launcher 120 in the manage mode 206.

Additionally, in one or more examples a resize operation for a representation is not committed until the representation being resized is deselected. Therefore, if the user selects a representation and resizes it from small to medium, and then back to small, the representation is returned to its original position.

Naming a Group

Figure 13:
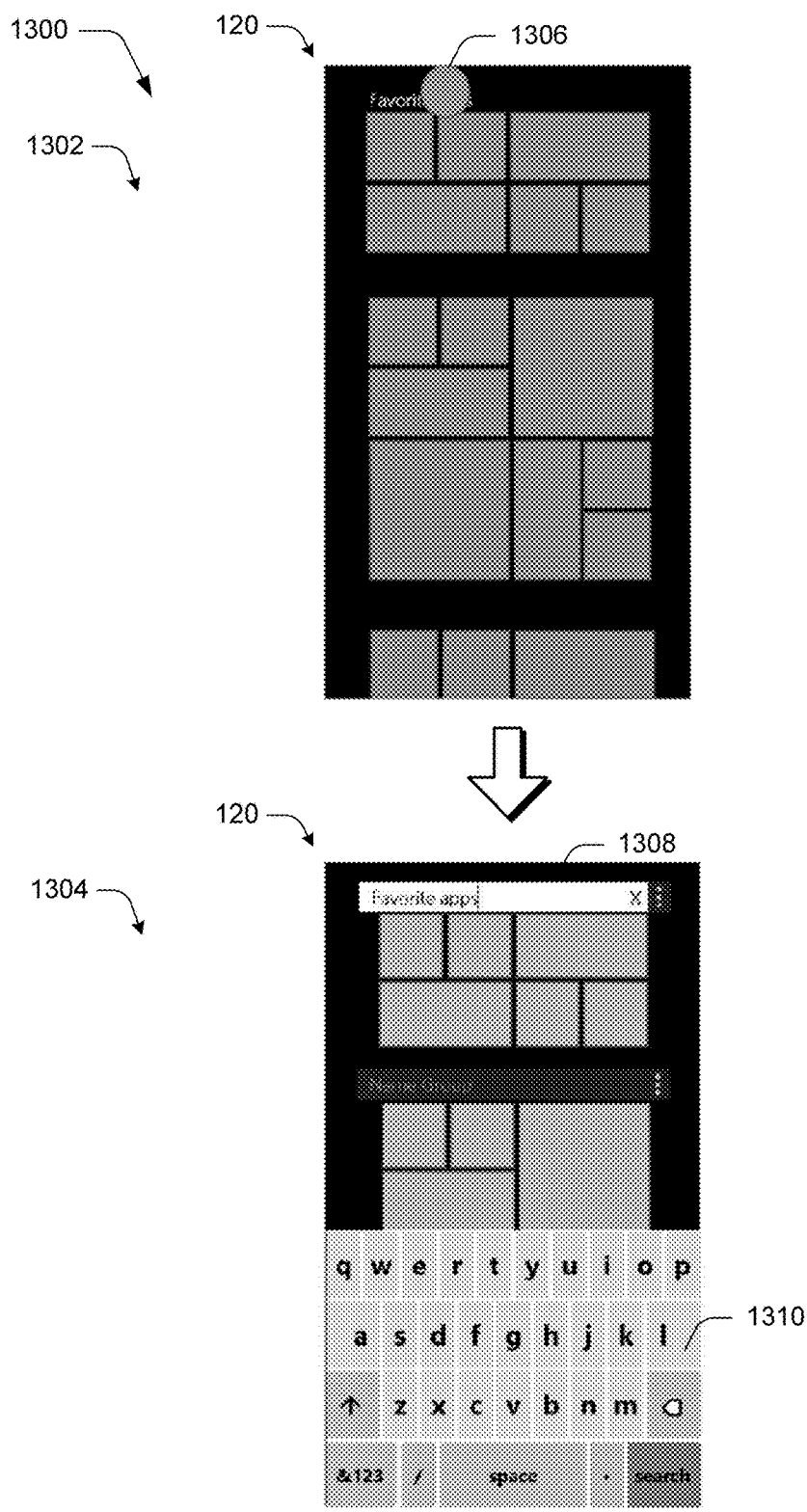
FIG. 13 depicts an example implementation involving naming of a group of representations in an application launcher that supports gesture-based interaction.

FIG. 13 depicts an example implementation 1300 involving naming of a group of representations in an application launcher 120 that supports gesture-based interaction. This example implementation is illustrated using first and second stages 1302, 1304. Upon entry into the manage mode 206, the launcher module 118 causes a header to be displayed proximal to respective groups of representations to indicate functionality available to name to group. Thus, when in the manage mode 206 groups are nameable via gestures, e.g., touch. In instances in which the manage mode 206 is entered by selection 1306 of a header (e.g., a "press and hold" touch input) as shown in the first stage 1302, an edit box 1308 is output as shown in the second stage 1304 along with a virtual keyboard 1310 that is usable to enter a name for the header. If already in the manage mode 206, a user may select the header 1306 which will also cause output of the edit box 1308 and keyboard 1310 as shown in the second stage 1304.

In one or more implementations, if display of the virtual keyboard 1310 would obscure the header 1306, an animation is output by the launcher module 118 to move the header 1306 (e.g., upwards) such that a user may view a result of the inputs, i.e., what the user is typing. This is performed if the virtual keyboard 1310 is to be displayed in a docked position by default. If the user moves the virtual keyboard 1310, then the animation is not employed.

Display of the keyboard 1310 is dismissed when the user commits the name in a variety of ways. For example, the display is dismissed responsive to a selection of an area outside of a display of the header 1306 or edit box 1308, but which does not cause exit of the manage mode 206 and thus supports another user selection such as the item being selected outside the header. In other examples, selection of an "enter" or "esc" key on a keyboard, a "back" button, and so on are used to dismiss the virtual keyboard 1310. In instances in which a name has not already been entered, a display of "Name Group" is output by the launcher module 118 to hint availability of naming the group.

As shown in the first stage 1302, for instance, a selection 1306 is made of a header, such as a press and hold gesture involving a header. In response, the launcher module 118 causes entry into the manage mode 206, which in this case includes output of an edit box 1308 and virtual keyboard 1310 as described above.

Figure 14:
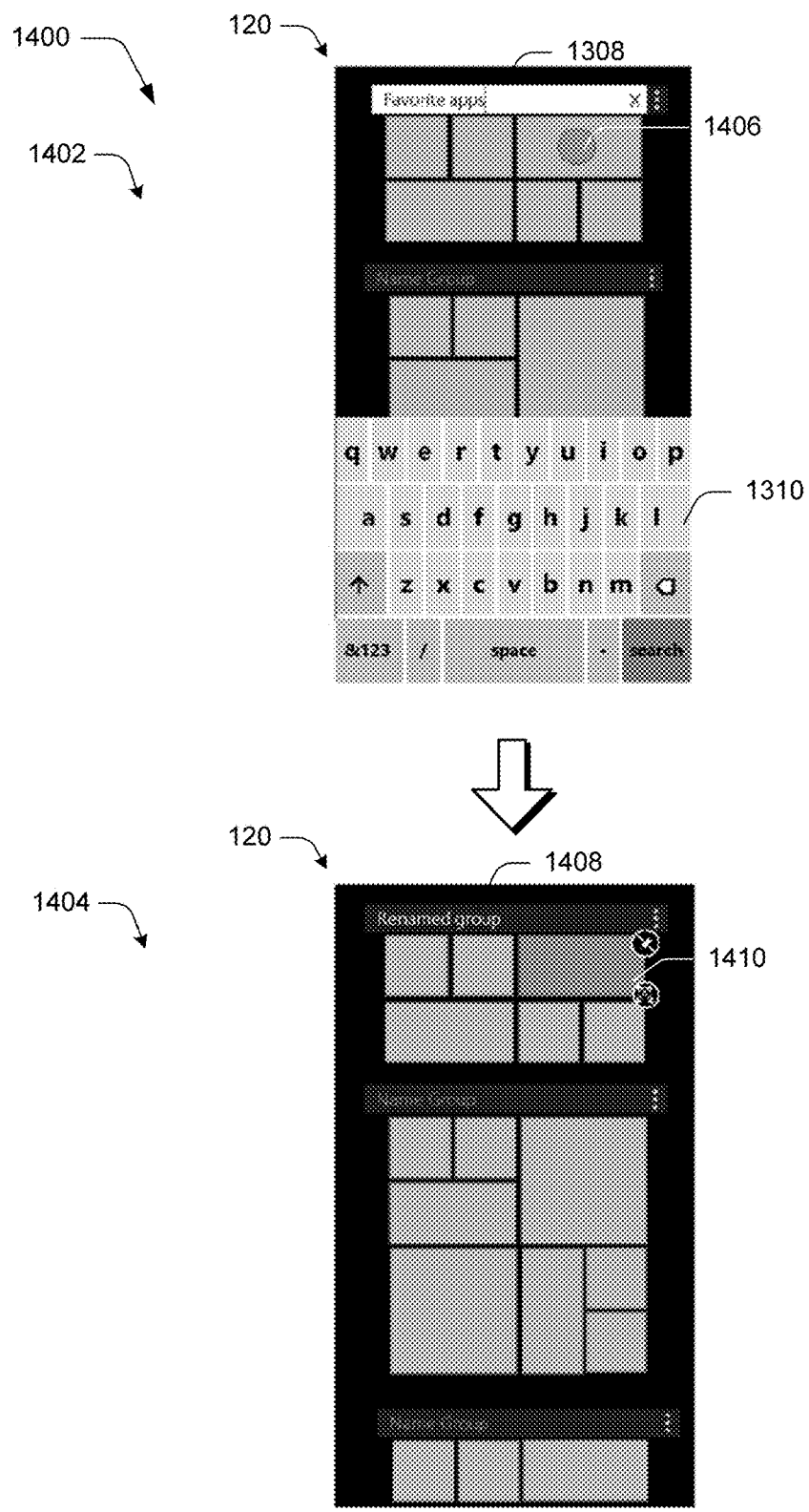
FIG. 14 depicts an example implementation that continues the implementation of FIG. 13 involving naming of a group of representations in an application launcher that supports gesture-based interaction.

FIG. 14 depicts an example implementation 1400 that continues the implementation 1300 of FIG. 13 involving naming of a group of representations in an application launcher 120 that supports gesture-based interaction. This implementation is illustrated using first and second stages 1402, 1404. At the first stage 1402, a user completes entry of the name via the virtual keyboard 1310 and commits the change by selecting 1406 a representation outside of the edit box or virtual keyboard 1310.

At the second stage 1404, the selection causes the name 1408 to be committed. Also, the selection 1306 causes the selected representation 1410 to output commands usable to resize the tile or cause output of the context menu as previously described.

Figure 15:
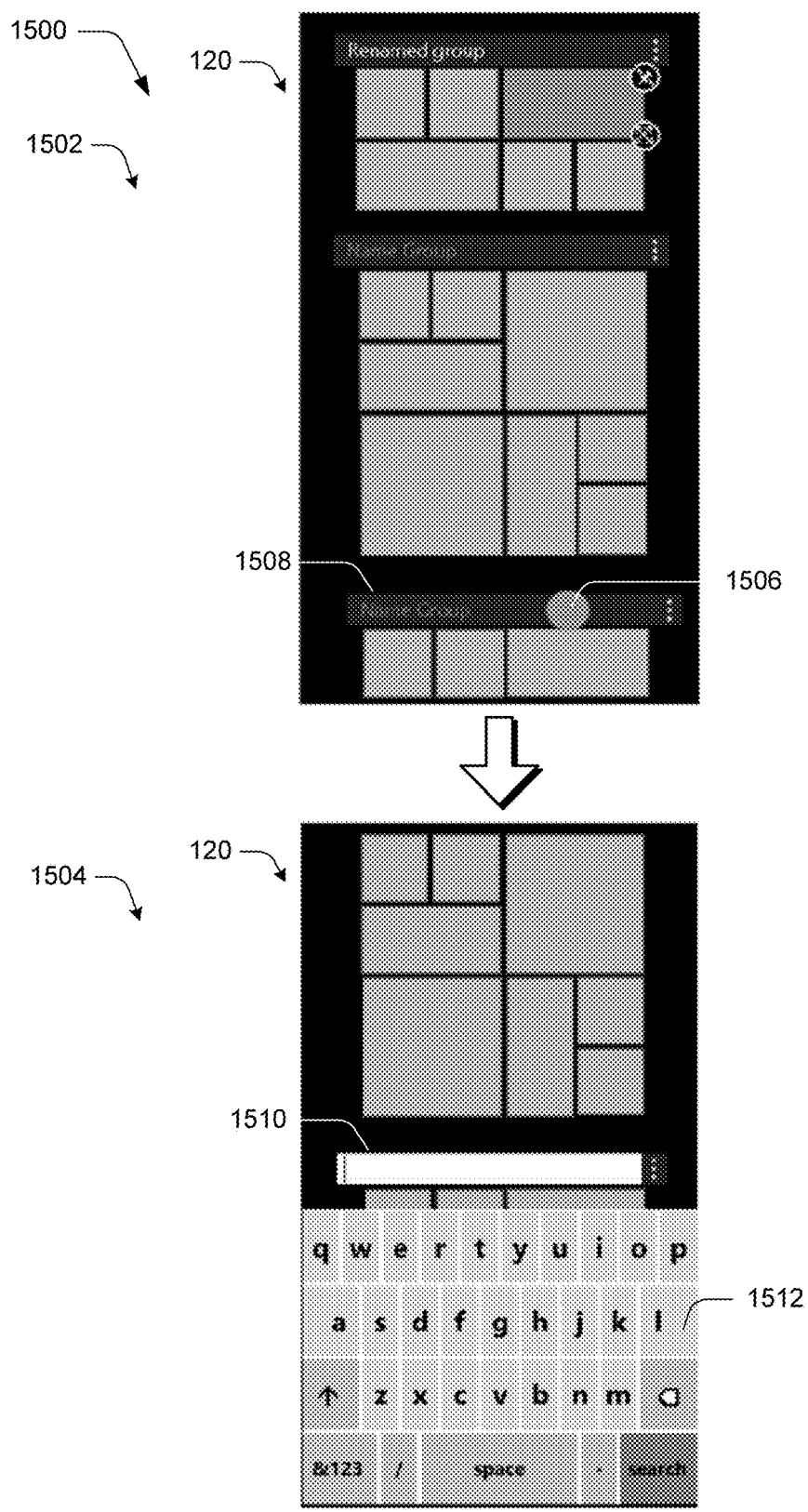
FIG. 15 depicts an example implementation involving naming of a group of representations in an application launcher that supports gesture-based interaction when already in a manage mode.

FIG. 15 depicts an example implementation 1500 involving naming of a group of representations in an application launcher 120 that supports gesture-based interaction when already in a manage mode 206. This example implementation 1500 is illustrated using first and second stages 1502, 1504. At the first stage 1502, a selection 1506 is made to a header 1508 while in the manage mode 206.

As shown at the second stage 1504, this causes output of the edit box 1510 and the virtual keyboard 1512 as previously described. In this case, display of the virtual keyboard 1512 would have obscured the header 1508 and so the header 1508 is moved via animation by the launcher module 118 as previously described.

Figure 16:
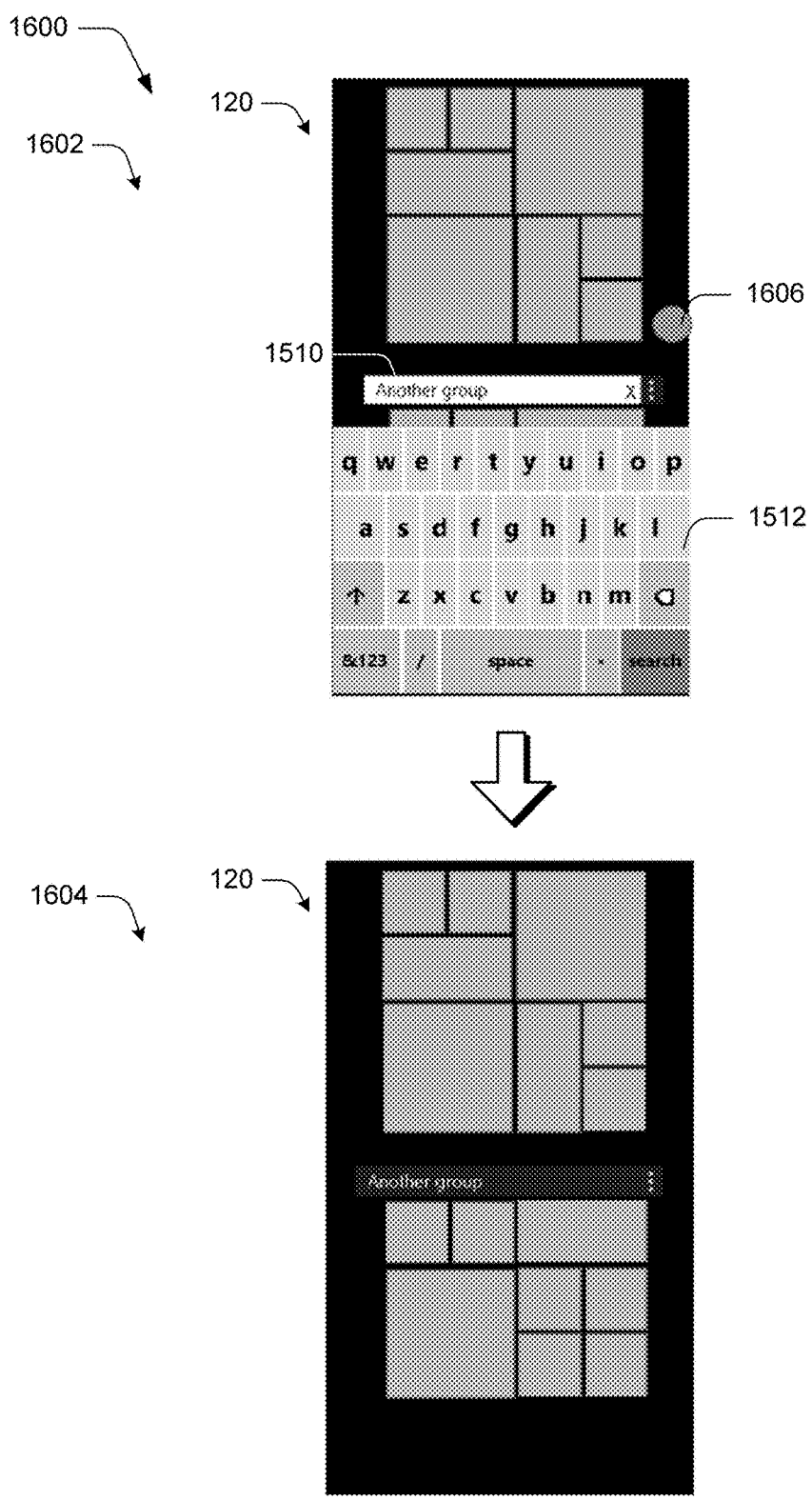
FIG. 16 depicts an example implementation that continues the implementation of FIG. 15 involving naming of a group of representations in an application launcher that support gesture-based interaction.

FIG. 16 depicts an example implementation 1600 that continues the implementation 1500 of FIG. 15 involving naming of a group of representations in an application launcher 120 that supports gesture-based interaction. This example implementation 1600 is illustrated using first and second stages 1602, 1604. At the first stage 1602, entry of the name is completed and a user has selected 1602 (e.g., "tapped outside") an area in negative space that is outside the virtual keyboard 1510 and edit box 1520. At the second stage 1604, the name is committed and the launcher module 118 causes the application launcher 120 to remain in the manage mode 206.

Figure 17:
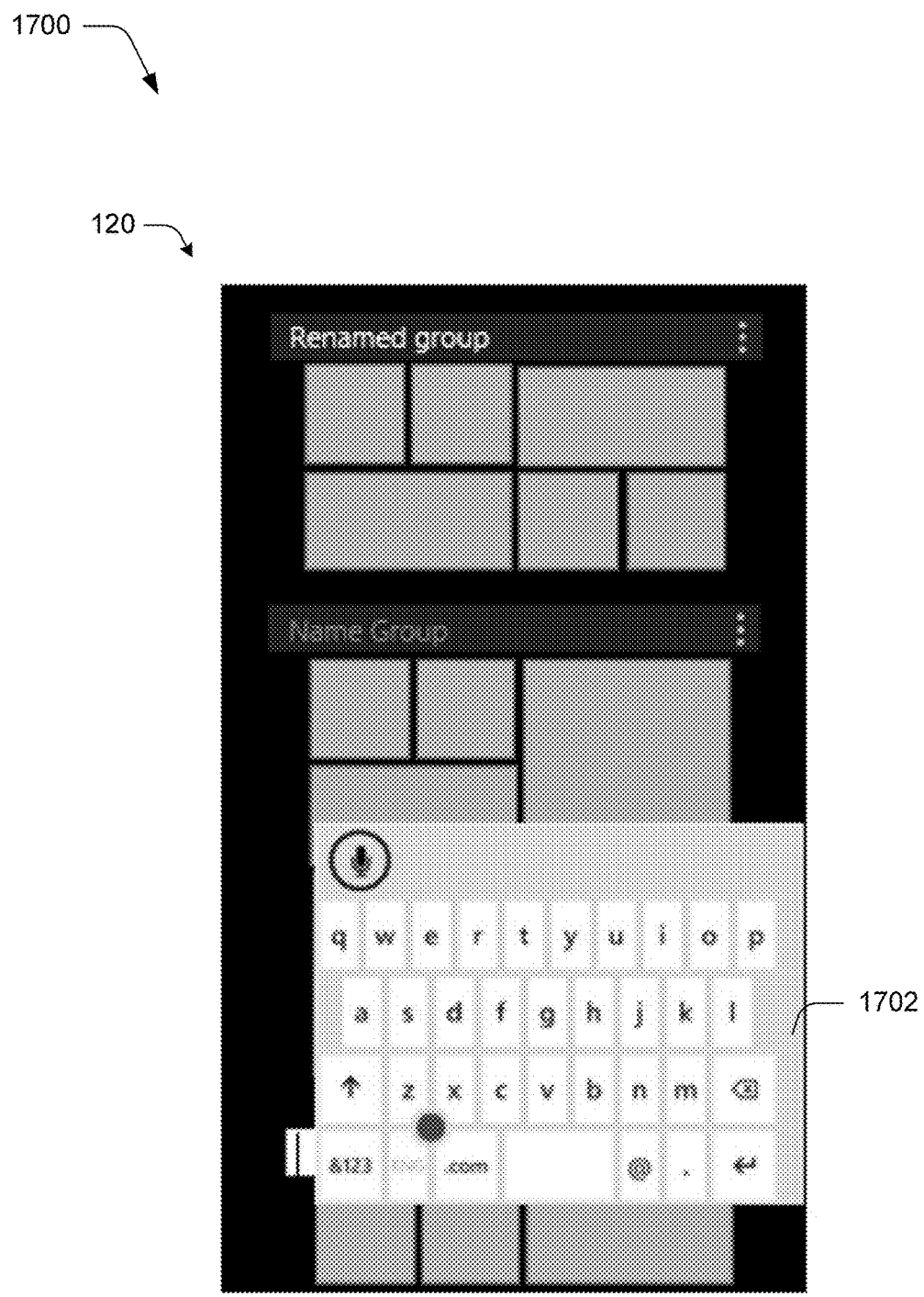
FIG. 17 depicts an example implementation in which a virtual keyboard is moved from a default position.

FIG. 17 depicts an example implementation 1700 in which a virtual keyboard 1702 is moved from a default position. In this example, the virtual keyboard 1702 is moved upward in the application launcher 120. Accordingly, the launcher module 118 does not employ animations to move representations in the application launcher 120 and corresponding headers to make them viewable.

Figure 18:
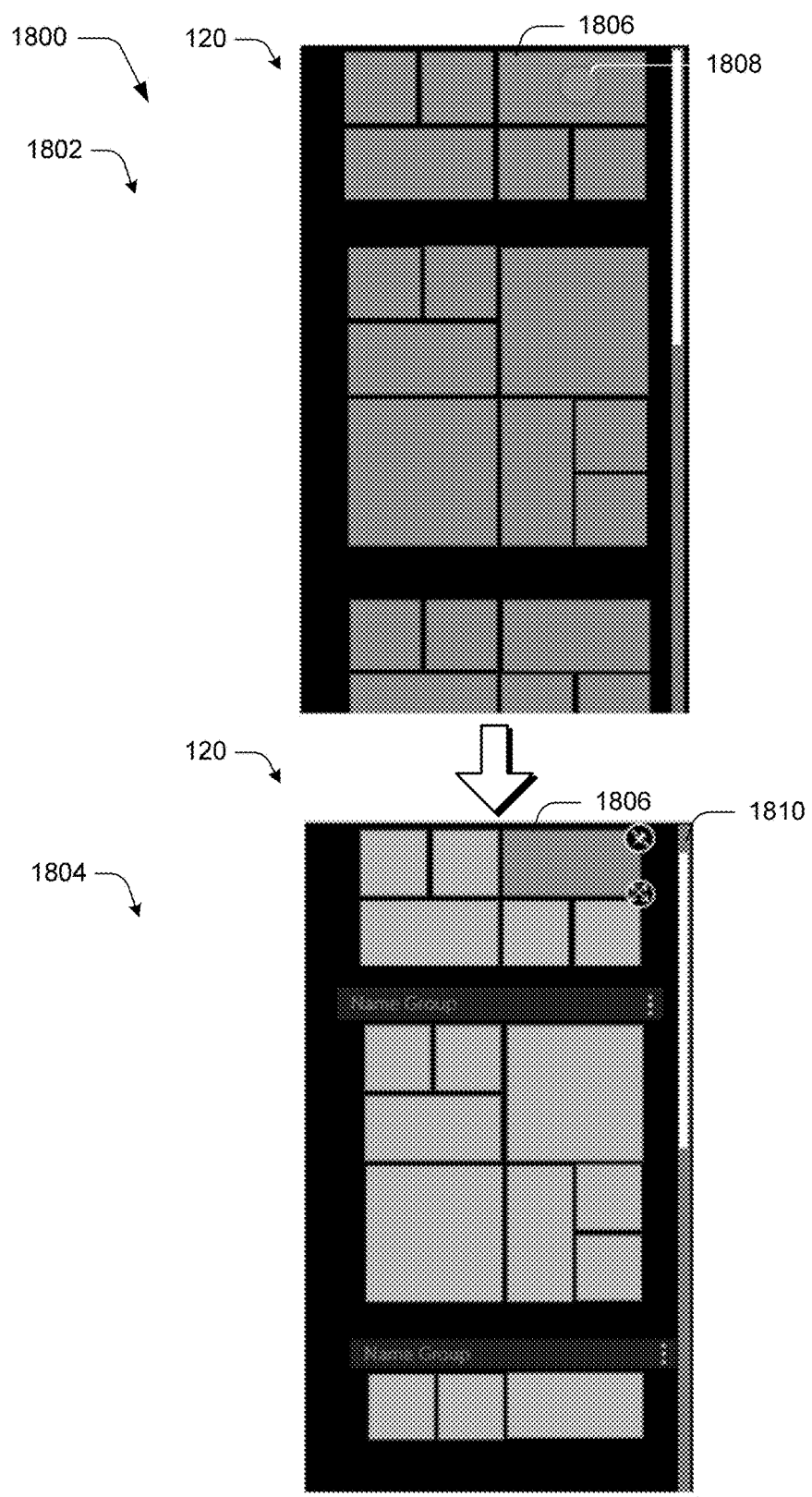
FIG. 18 depicts a beginning of an example implementation involving naming when a group positioned at a top of the application launcher is unnamed.

FIG. 18 depicts a beginning of an example implementation 1800 involving naming when a group positioned at a top of the application launcher 120 is unnamed. This example implementation 1800 is shown using first and second stages 1802, 1804. At the first stage 1802, because the launcher module 118 collapses header space associated with a group 1806 when not used, the launcher module 118 employs targeted techniques to permit naming of this group 1806 as the user is not able to enter manage module 206 by pressing/holding on the header. Instead, the launcher module 118 enters the manage module 206 responsive to selection of a representation 1808 within the group 1806.

At the second stage 1804, the application launcher 120 includes the same content as it did at the first stage 1802. However, space has been added above the group 1806, as indicated by the scroll bar 1810 in this example. Thus, a user may then scrolls up in the application launcher 120 to name the group, further discussion of which is described in the following and shown in a corresponding figure.

Figure 19:
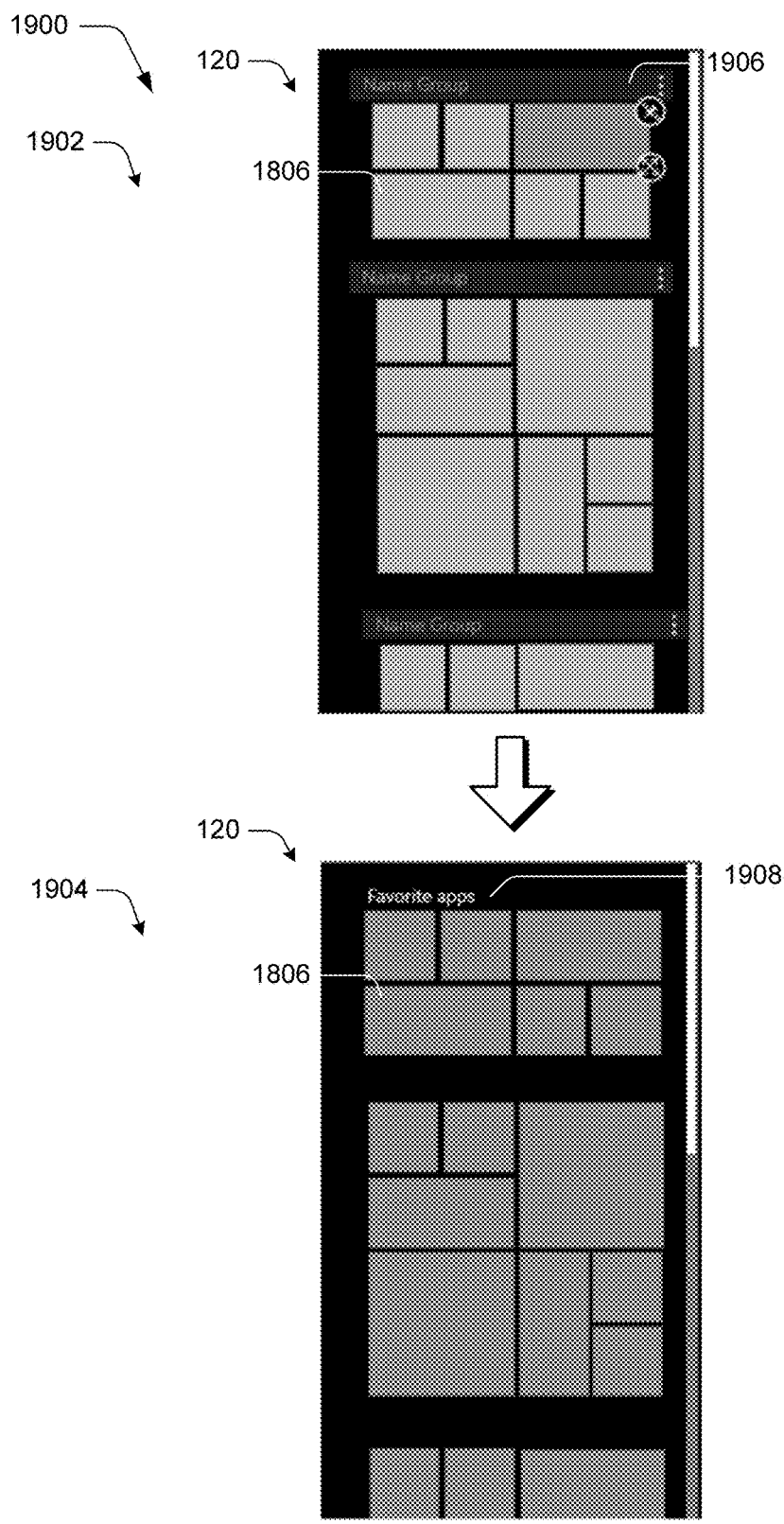
FIG. 19 depicts an example implementation that continues the example implementation of FIG. 18 involving naming when a group positioned at a top of the application launcher is unnamed.

FIG. 19 depicts an example implementation 1900 that continues the example implementation 1800 of FIG. 18 involving naming when a group positioned at a top of the application launcher 120 is unnamed. This example implementation 1900 is illustrated using first and second stages 1902, 1904. At the first stage 1902, a user has navigated the application launcher 120 (e.g., scrolled up) to view a header 1906 added to the group 1806. The user may then provide inputs as desired to name the group 1806 as previously described. As shown at the second stage 1904, the name is then committed as part of the header 1908, which has been added to the group 1806.

When using a cursor control device, as previously described the manage mode 206 is not entered. Accordingly, once a cursor is moved to a space above the group at which the header would be positioned, a visual characteristic is employed, such as an option to "Name Group" as a header. The user may then select the option to name the group, such as to cause output of an edit box as described before and may commit the name, e.g., by selecting (e.g., clicking) an area outside of the edit box. A size of the application launcher 120 may expand upon initial selection as previously described, e.g., to expand a width as shown in FIG. 4. Selection of an "esc" key causes exit from this mode.

Figure 20:
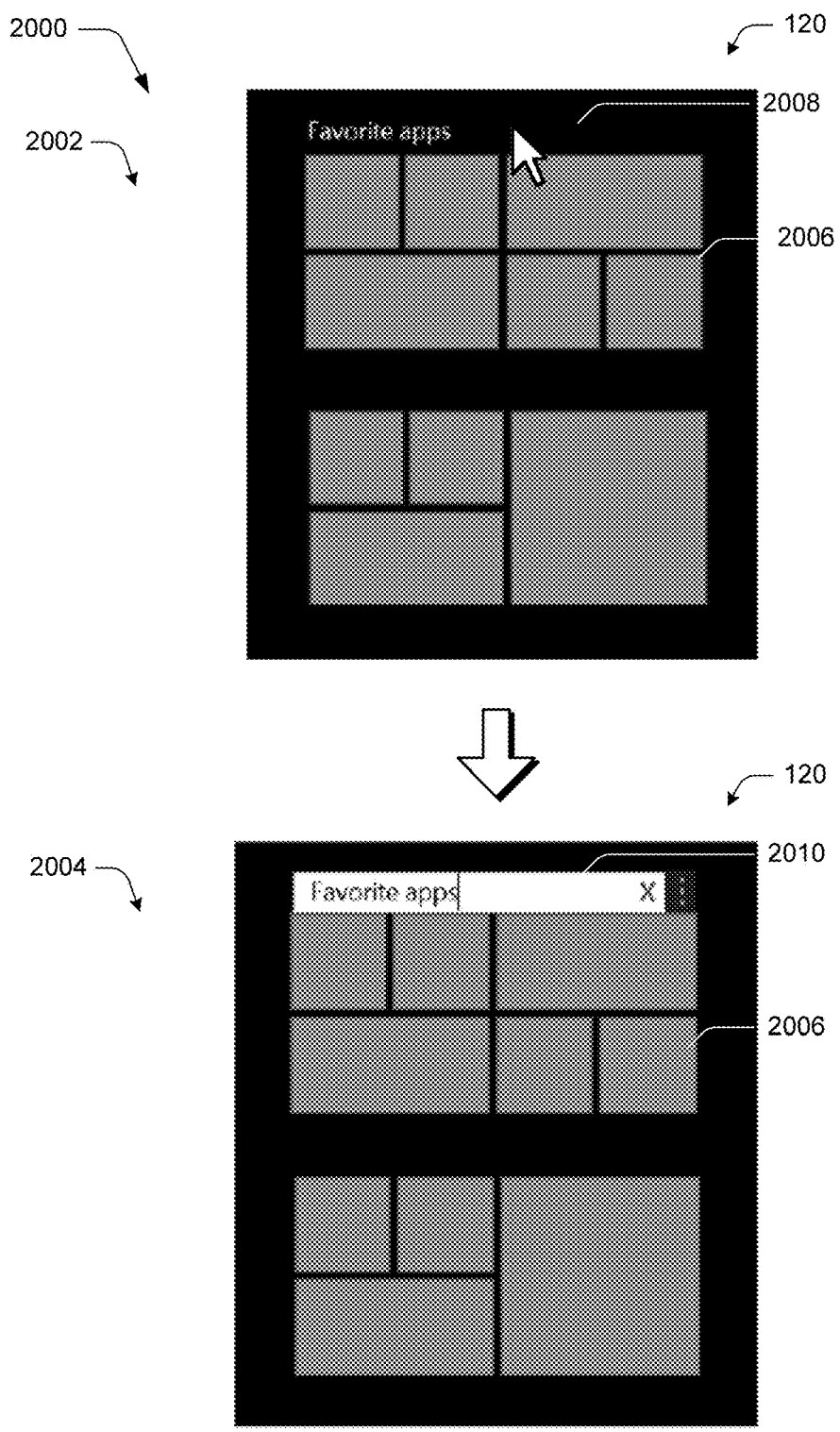
FIG. 20 depicts another example implementation of renaming a group in an application launcher.

FIG. 20 depicts another example implementation 2000 of renaming a group in an application launcher 120. This example implementation 2000 is illustrated using first and second stages 2002, 2004. At the first stage 2002, a cursor is used to select a header of a group 206, e.g., by clicking on the header 2006, to cause output of an edit box 2008 usable to input a name to rename the group 2006.

At the second stage 2004, an edit box 2008 is displayed by the launcher module 118 responsive to the selection. Output of the edit box 2008 may cause a name of the group that was left justified with a left edge of the group 2006 to move such that the edit box 2008 is left justified with the left edge of the group 2006.

Figure 21:
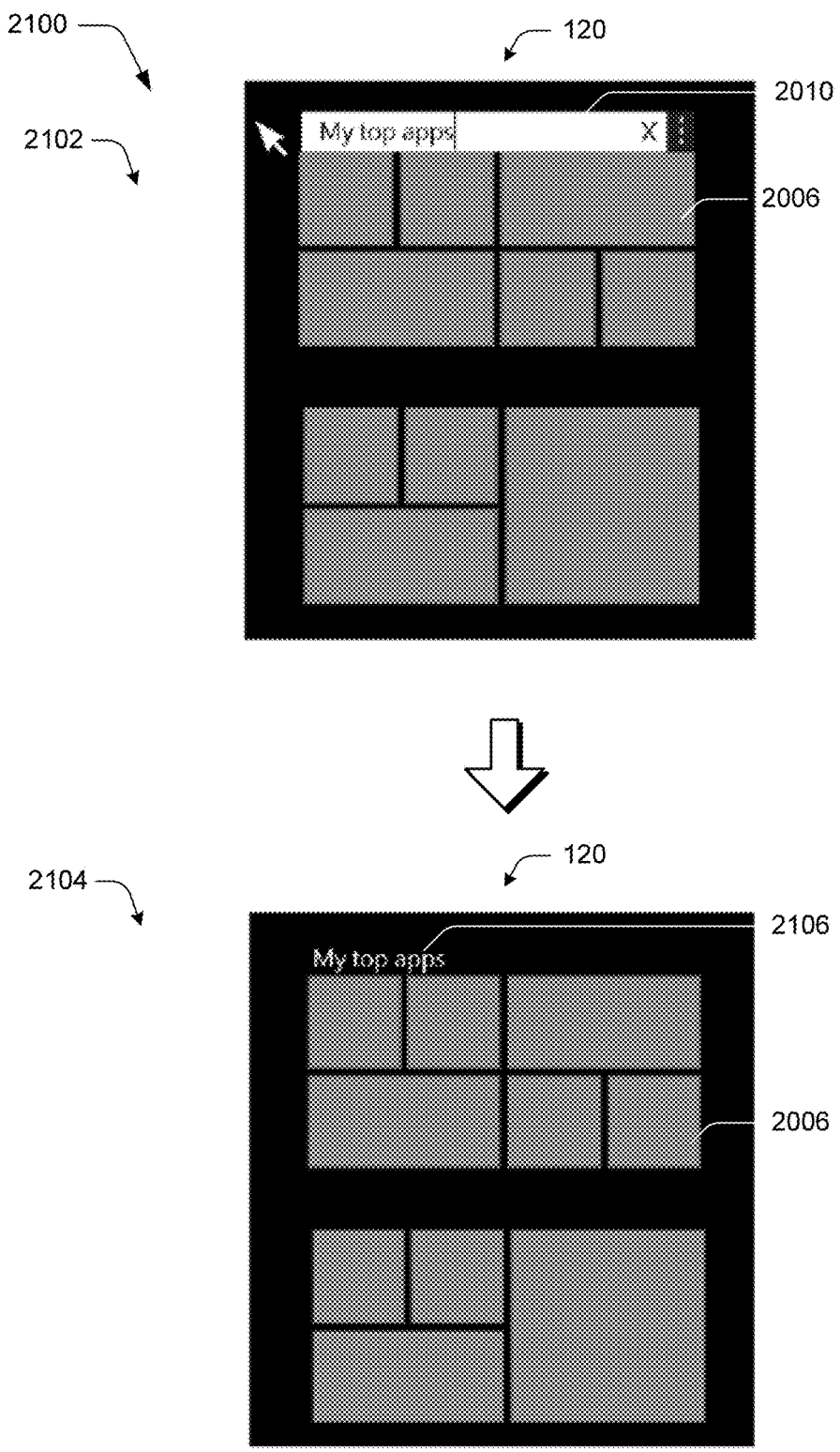
FIG. 21 depicts an example implementation that continues the example implementation of FIG. 1 of renaming a group in an application launcher.

FIG. 21 depicts an example implementation 2100 that continues the example implementation 2000 of FIG. 1 of renaming a group in an application launcher. This example implementation 2100 is illustrated using first and second stages 2102, 2104. At the first stage 2102, a user enters text in the edit box 2010 to rename the group and then selects an area outside of the edit box 2010 to commit the change. In response, the name 2106 is committed and the header visual is removed as shown at the second stage 2104.

Figure 22:
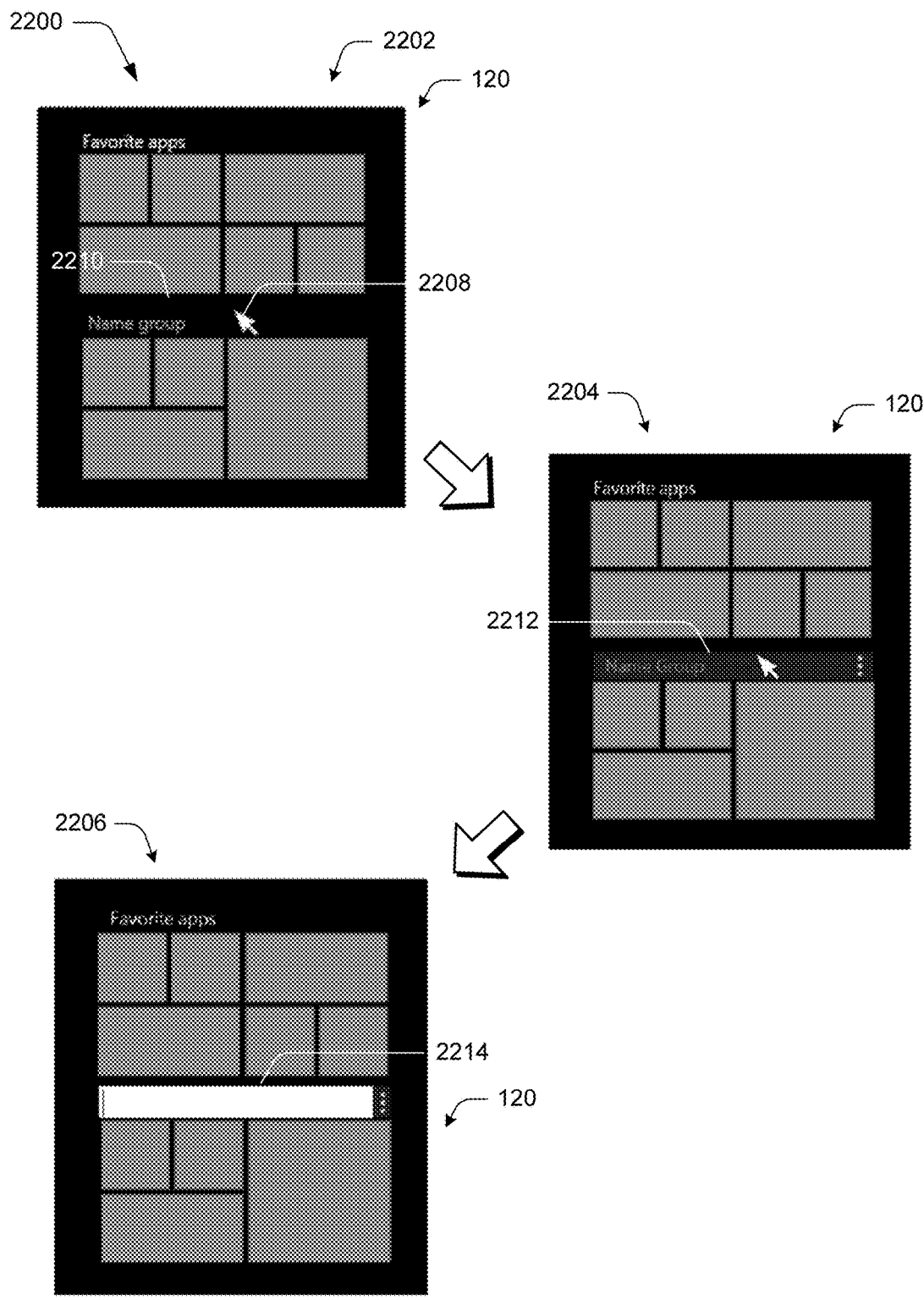
FIG. 22 depicts another example implementation of naming of a group in an application launcher that includes an indication of availability of the naming functionality of the launcher module.

FIG. 22 depicts another example implementation 2200 of naming of a group in an application launcher 120 that includes an indication of availability of the naming functionality of the launcher module 118. This example implementation 2200 includes use of first, second, and third stages 2202, 2204, 2206. At the first stage 2202, a cursor 2208 is disposed proximal to a header 2210 for a threshold amount of time, e.g., is hovered near the header 2210.

In response, an indication 2212 is output as illustrated at the second stage 2204 that includes the portion that is selectable to move the group as previously described. Upon selection of the indication 2212, the edit box 2214 is output by the launcher module 118. The user may then name the group and commit the changes as previously described.

Thus, for gesture interaction the manage mode 206 is first entered to name a group, e.g., by pressing/holding a header or otherwise as described above. This also causes selection of the header and output of an edit box. Otherwise, when in manage mode 206, the user may select a desired header to bring up the edit box to enter a desired name and commit the change, if any.

In a cursor interaction outside of manage mode 206, a cursor is hovered over the header of the group that causes output of a visual indication of available interaction. If selected, the edit box is output that is configured to accept inputs to specify a name. Selection of an area outside the edit box commits the name and removes the visuals.

For keyboard interaction, a user navigates through the headers to a particular one of interest, e.g., can "tab" through the headers. Once a desired header has focus in the manner, selection of the focused header (e.g., via an "enter" key) causes output of the edit box to name the group. Pressing enter again or navigating away causes the name to be committed to the group.

Figure 23:
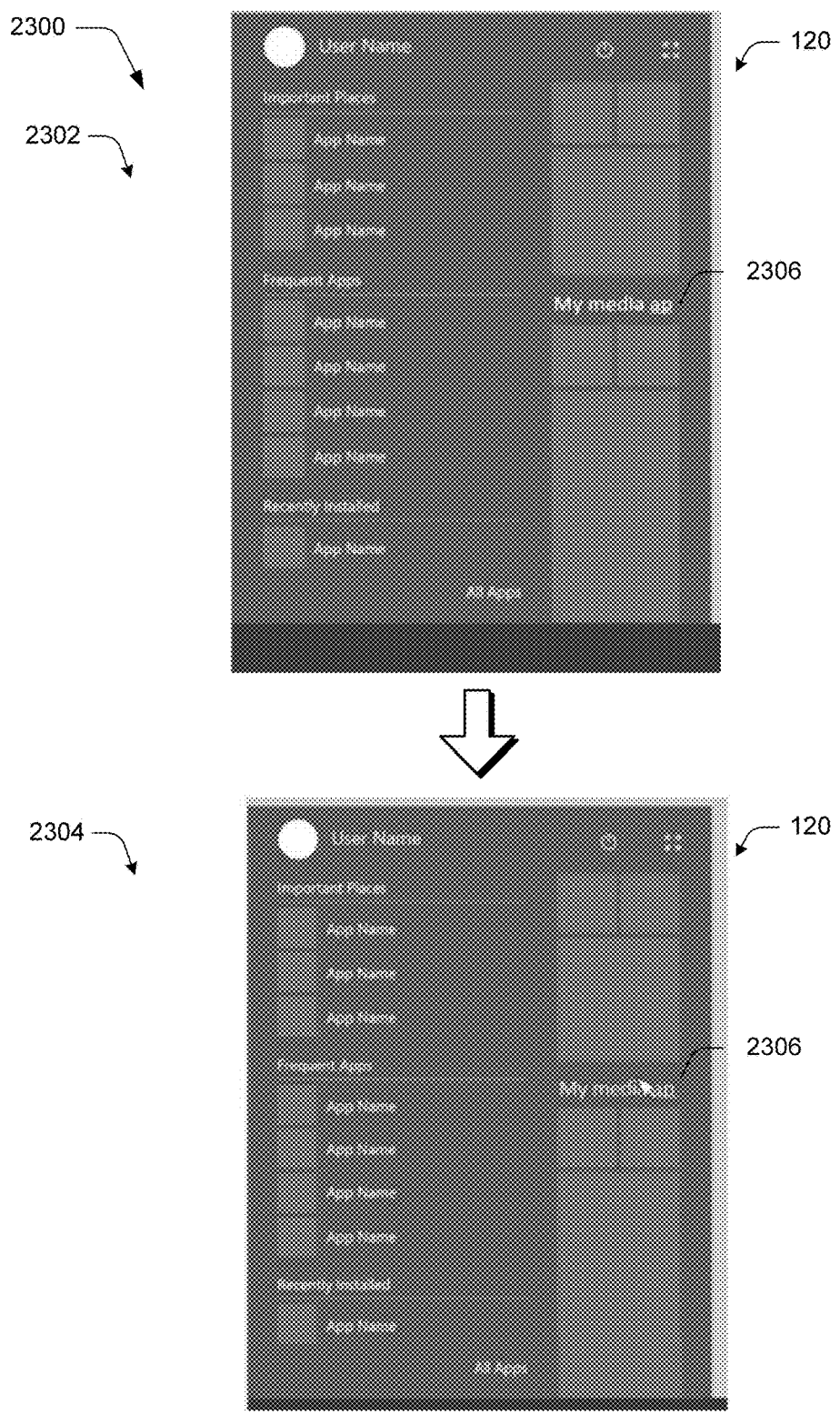
FIGS. 23-26 depicts another example implementation of naming of a group in an application launcher that includes resizing of the application launcher.

FIG. 23 depicts another example implementation 2300 of naming of a group in an application launcher 120 that includes resizing of the application launcher 120. This example implementation 2300 includes first and second stages 2302, 2304. At the first stage 2302, the application launcher 120 is configured as a start menu having first and second linear arrangements (e.g., columns) formed by groups of representations. This is an example of a collapsed state and as shown a name 2306 of a group is not shown in its entirety to comply with this state.

Figure 24:
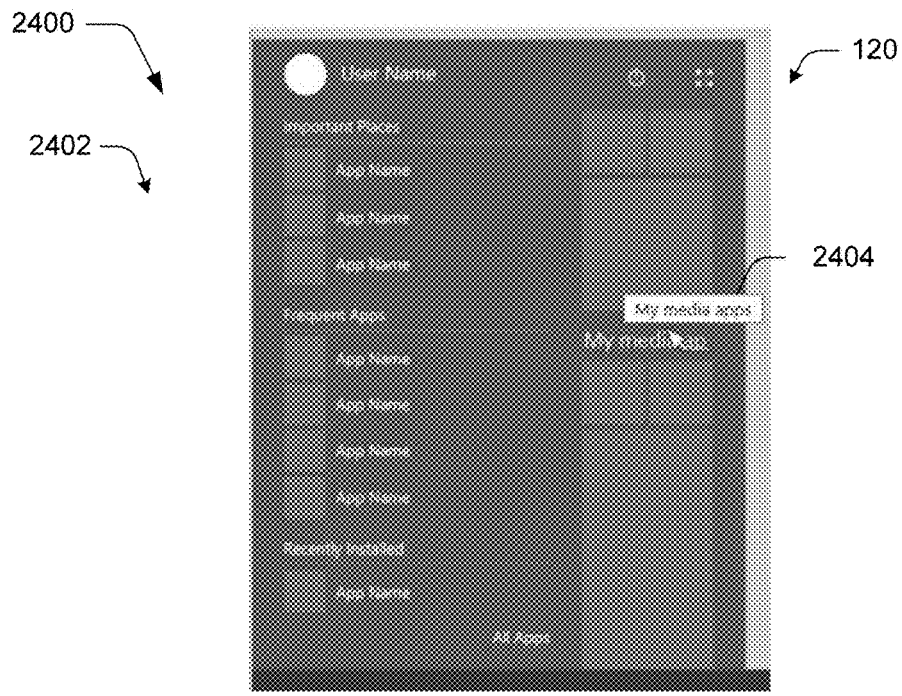
Figure 24:
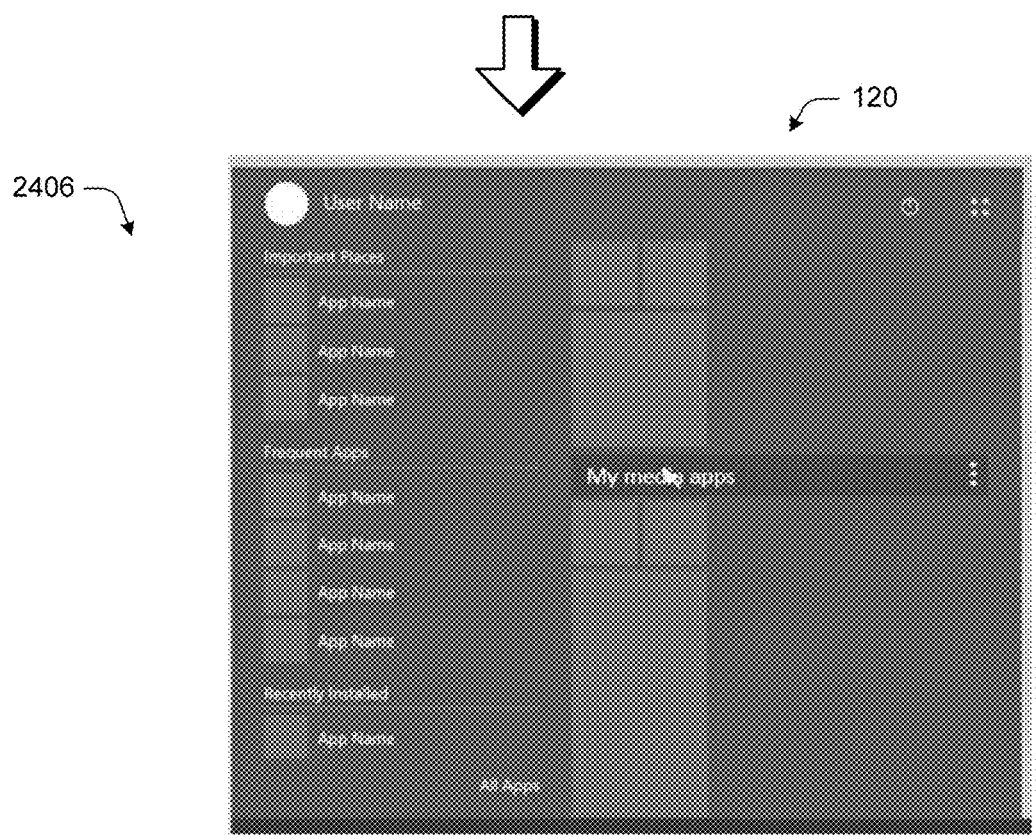

At the second stage 2304, a cursor is disposed proximal to the header 2306 over a threshold amount of time to rename the group. At a first stage 2402 in an example implementation 2400 of FIG. 24, a tool tip 2404 is output that displays the full name of the group because the header was truncated. As shown in a second stage 2406 of FIG. 24, responsive to selection of the header (e.g., a click) an amount of display area consumed by the application launcher 120 in the display device 108 is expanded, e.g., a width of the application launcher 120.

Figure 25:
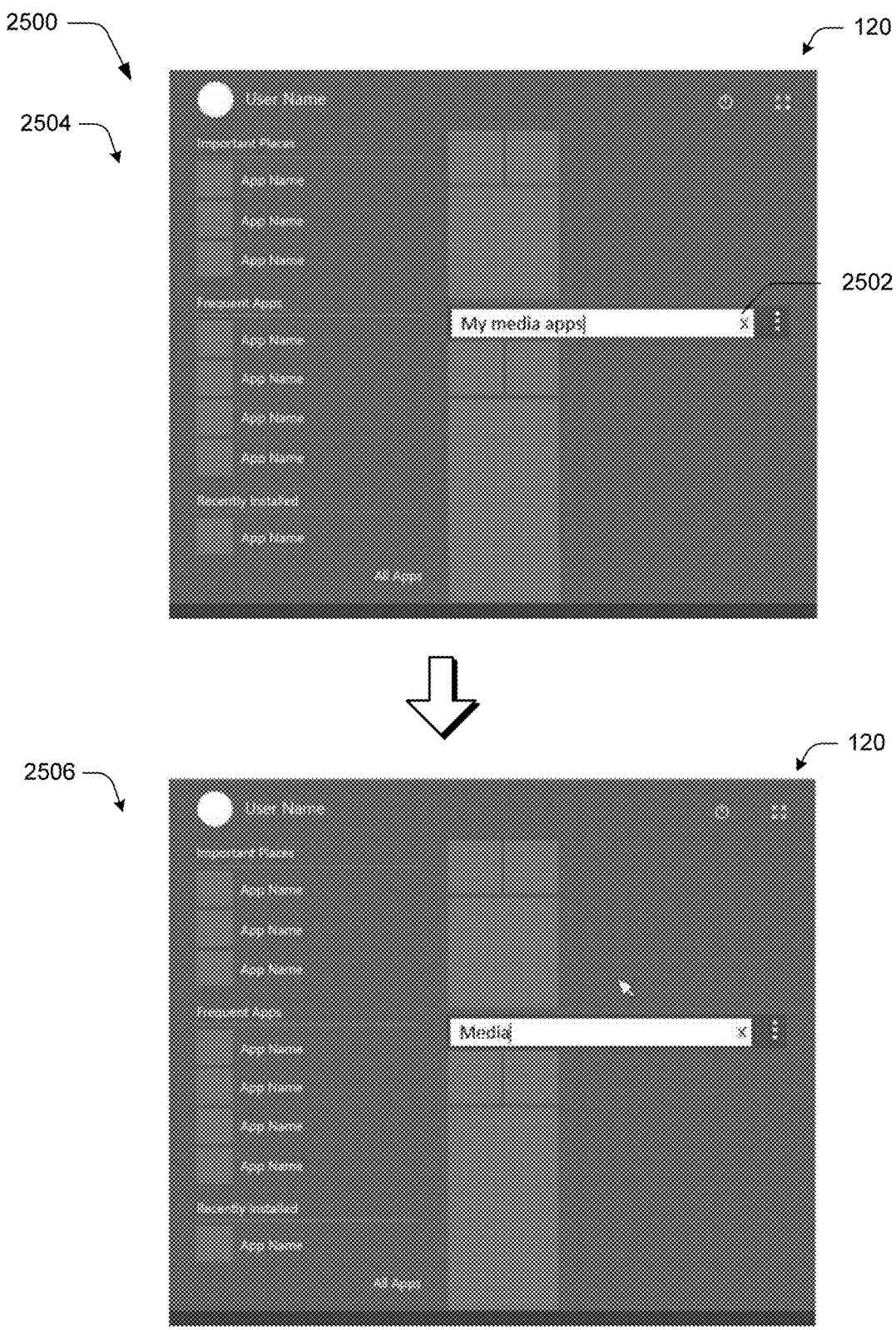
Figure 26:
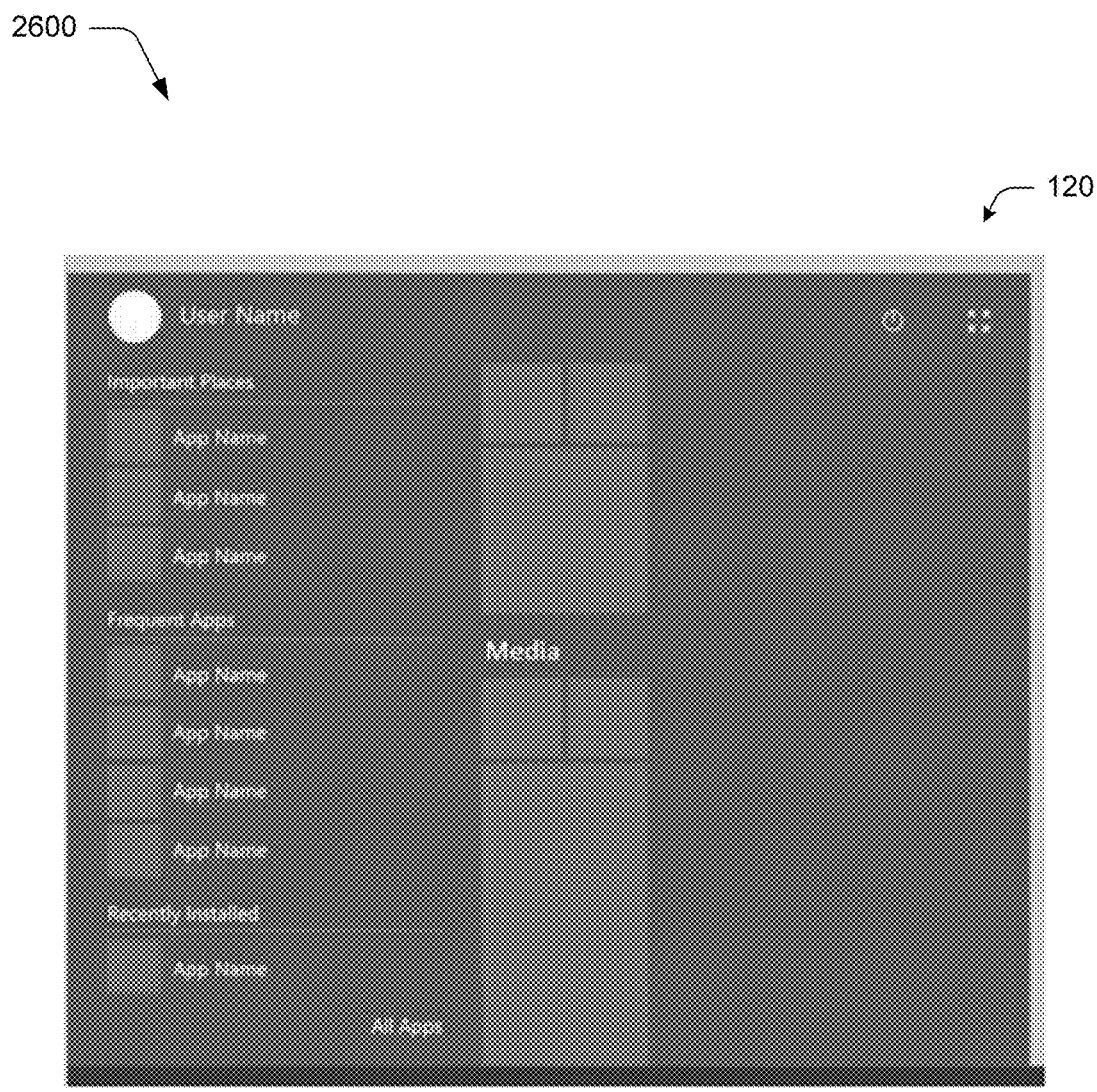

Selection of an indication of availability of renaming the header causes output of an edit box 2502 as shown in a first stage 2504 of an example implementation of FIG. 25. Text is entered into the edit box 2502 as shown in a second stage 2506 of the example implementation 2500. Subsequent selection of negative space in the application launcher 120 causes the name to be committed to the group by the application launcher 120 as shown in the example implementation 2600 of FIG. 26. Thus, a variety of different techniques are usable to name groups of representation, further discussion of which is described in the following procedures and shown in corresponding figures.

Example Procedures

The following discussion describes application launcher techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment described above.

Functionality, features, and concepts described in relation to the examples of FIGS. 1-26 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 27:
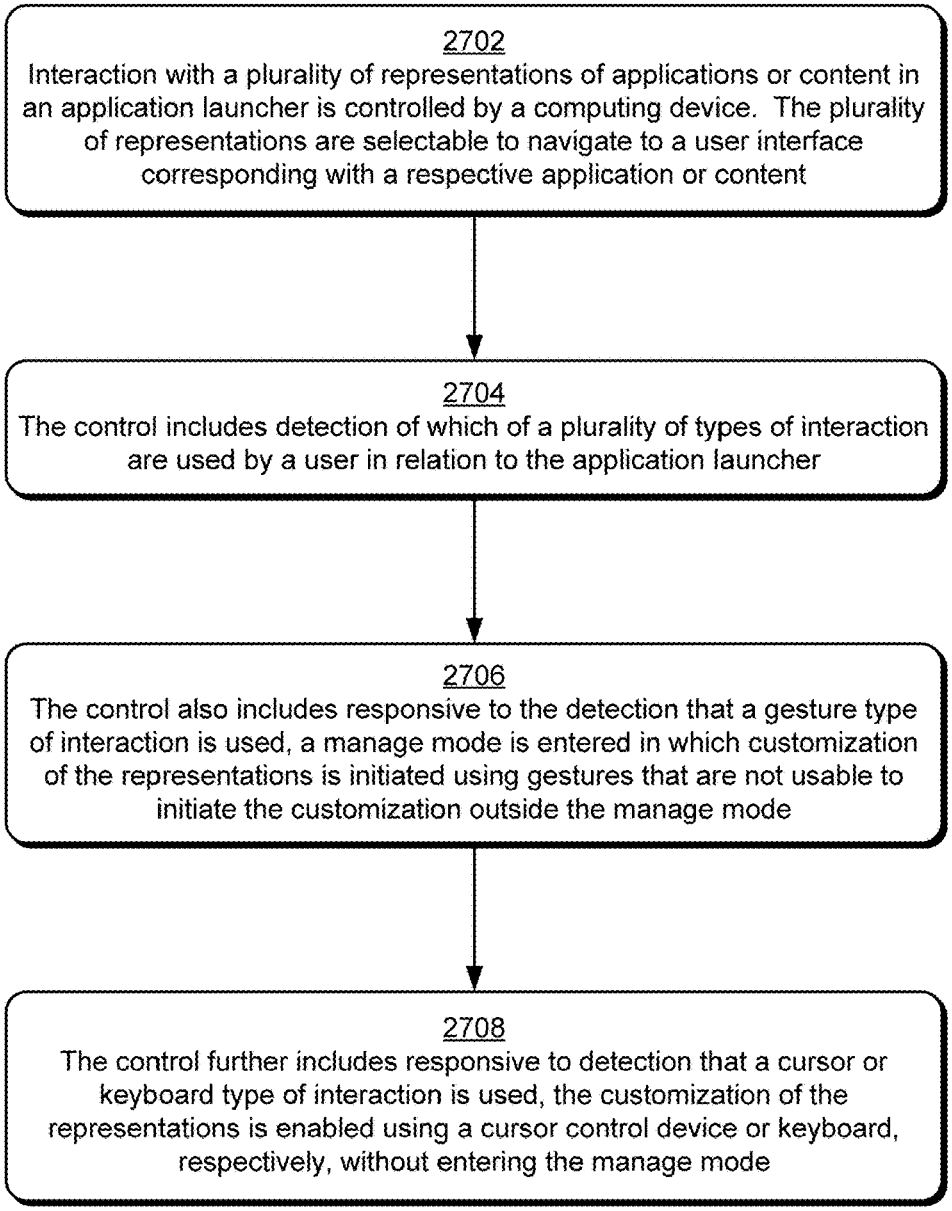
FIG. 27 is a flow diagram depicting a procedure in an example implementation involving customization of an application launcher.

FIG. 27 depicts a procedure 2700 in an example implementation in which representation interaction is controlled. Interaction with a plurality of representations of applications or content in an application launcher is controlled by a computing device. The plurality of representations are selectable to navigate to a user interface corresponding with a respective application or content (block 2702). For example, the application launcher is configurable as a start screen, start menu, a root level in a file hierarchy, and so forth.

The control includes detection of which of a plurality of types of interaction are used by a user in relation to the application launcher (block 2704). This includes detection of whether a user has interacted via a gesture, e.g., captured using touchscreen functionality of the display device, a camera supporting a natural user interface, and so forth. This also include detection of non-gesture types of interaction, such as those involving a cursor and cursor control device, a keyboard, and so forth.

The control also includes responsive to the detection that a gesture type of interaction is used, a manage mode is entered in which customization of the representations is initiated using gestures that are not usable to initiate the customization outside the manage mode (block 2706). The control further includes responsive to detection that a cursor or keyboard type of interaction is used, the customization of the representations is enabled using a cursor control device or keyboard, respectively, without entering the manage mode (block 2708).

The launcher module 118, for instance, enters the manage mode responsive to selection of a header or representation. Gestures may then be used within the manage mode to perform customizations that are not performable outside this mode. For example, movement of a representation or group of representations may be performed using a drag and drop gesture that outside the manage mode would cause a panning gesture or other navigation. Other examples are also contemplated, such as to output context menus having different sets of commands based on input type, naming of groups, and so forth as described above.

Example System and Device

FIG. 28 illustrates an example system generally at 2800 that includes an example computing device 2802 that is representative of one or more computing systems and/or devices that may implement the various techniques described herein as shown through inclusion of the launcher module 118. The computing device 2802 may be, for example, a server of a service provider, a device associated with a client (e.g., a client device), an on-chip system, and/or any other suitable computing device or computing system.

The example computing device 2802 as illustrated includes a processing system 2804, one or more computer-readable media 2806, and one or more I/O interface 2808 that are communicatively coupled, one to another. Although not shown, the computing device 2802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2804 is representative of functionality to perform one or more operations using hardware. Accordingly, the processing system 2804 is illustrated as including hardware element 2810 that may be configured as processors, functional blocks, and so forth. This may include implementation in hardware as an application specific integrated circuit or other logic device formed using one or more semiconductors. The hardware elements 2810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2806 is illustrated as including memory/storage 2812. The memory/storage 2812 represents memory/storage capacity associated with one or more computer-readable media. The memory/storage component 2812 may include volatile media (such as random access memory (RAM)) and/or nonvolatile media (such as read only memory (ROM), Flash memory, optical disks, magnetic disks, and so forth). The memory/storage component 2812 may include fixed media (e.g., RAM, ROM, a fixed hard drive, and so on) as well as removable media (e.g., Flash memory, a removable hard drive, an optical disc, and so forth). The computer-readable media 2806 may be configured in a variety of other ways as further described below.

Input/output interface(s) 2808 are representative of functionality to allow a user to enter commands and information to computing device 2802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2810 and computer-readable media 2806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2810. The computing device 2802 may be configured to implement particular instructions and/or functions corresponding to the software and/or hardware modules. Accordingly, implementation of a module that is executable by the computing device 2802 as software may be achieved at least partially in hardware, e.g., through use of computer-readable storage media and/or hardware elements 2810 of the processing system 2804. The instructions and/or functions may be executable/operable by one or more articles of manufacture (for example, one or more computing devices 2802 and/or processing systems 2804) to implement techniques, modules, and examples described herein.

As further illustrated in FIG. 28, the example system 2800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 2800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 2802 may assume a variety of different configurations, such as for computer 2814, mobile 2816, and television 2818 uses. Each of these configurations includes devices that may have generally different constructs and capabilities, and thus the computing device 2802 may be configured according to one or more of the different device classes. For instance, the computing device 2802 may be implemented as the computer 2814 class of a device that includes a personal computer, desktop computer, a multi-screen computer, laptop computer, netbook, and so on.

The computing device 2802 may also be implemented as the mobile 2816 class of device that includes mobile devices, such as a mobile phone, portable music player, portable gaming device, a tablet computer, a multi-screen computer, and so on. The computing device 2802 may also be implemented as the television 2818 class of device that includes devices having or connected to generally larger screens in casual viewing environments. These devices include televisions, set-top boxes, gaming consoles, and so on.

The techniques described herein may be supported by these various configurations of the computing device 2802 and are not limited to the specific examples of the techniques described herein. This functionality may also be implemented all or in part through use of a distributed system, such as over a "cloud" 2820 via a platform 2822 as described below.

The cloud 2820 includes and/or is representative of a platform 2822 for resources 2824. The platform 2822 abstracts underlying functionality of hardware (e.g., servers) and software resources of the cloud 2820. The resources 2824 may include applications and/or data that can be utilized while computer processing is executed on servers that are remote from the computing device 2802. Resources 2824 can also include services provided over the Internet and/or through a subscriber network, such as a cellular or Wi-Fi network.

The platform 2822 may abstract resources and functions to connect the computing device 2802 with other computing devices. The platform 2822 may also serve to abstract scaling of resources to provide a corresponding level of scale to encountered demand for the resources 2824 that are implemented via the platform 2822. Accordingly, in an interconnected device embodiment, implementation of functionality described herein may be distributed throughout the system 2800. For example, the functionality may be implemented in part on the computing device 2802 as well as via the platform 2822 that abstracts the functionality of the cloud 2820.

CONCLUSION AND EXAMPLE IMPLEMENTATIONS

Example implementations described herein include, but are not limited to, one or any combinations of one or more of the following examples:

Techniques involving control of interaction with an application launcher are described. In one or more implementations, interaction with a plurality of representations of applications or content in an application launcher is controlled by a computing device. The plurality of representations are selectable to navigate to a user interface corresponding with a respective said application or content. The controlling includes detection of which of a plurality of types of interaction are used by a user in relation to the application launcher. Responsive to the detection that a gesture type of interaction is used, a manage mode is entered in which customization or commands of the representations is initiated using gestures that are not usable to initiate the customization or commands outside the manage mode. Responsive to detection that a cursor or keyboard type of interaction is used, the customization or the commands of the representations is enabled using a cursor control device or keyboard, respectively, without entering the manage mode.

An example as described alone or in combination with any of the above or below examples, wherein the manage mode is associated with one or more visuals output as part of the customization and the one or more visuals are also output as part of the customization that is enabled by the cursor or keyboard type of interaction.

An example as described alone or in combination with any of the above or below examples, wherein the one or more visuals include reducing a size of a display of the plurality of representations or increasing an amount of area in the application launcher disposed between the plurality of representations, one to another.

An example as described alone or in combination with any of the above or below examples, wherein the manage mode supports output of a context menu in relation to respective ones of the plurality of representations having access to one or more commands that is different than a context menu output in relation to the respective ones of the plurality of representations when not in the manage mode.

An example as described alone or in combination with any of the above or below examples, in which the context menu output in the manage mode includes a menu having a first set of commands and a submenu having a second set of commands that is different that the first set of commands; and the context menu that is not output in the manage mode has a menu having the second set of commands and a submenu having the first set of commands.

An example as described alone or in combination with any of the above or below examples, wherein the first set of commands support customization of the representation and the second set of commands do not.

An example as described alone or in combination with any of the above or below examples, wherein the detecting that the gesture said type of interaction is used is performed by recognizing selection of a respective said representation or header of a group of said representations using touchscreen functionality of a display device or a camera.

An example as described alone or in combination with any of the above or below examples, wherein at least one of the gestures used to perform the customization of the representations in the manage mode causes panning of the application launcher when not in the manage mode.

An example as described alone or in combination with any of the above or below examples, wherein the customization of the representations involves movement of one or more of the representations or a group of the representations from one location to another in the application launcher.

An example as described alone or in combination with any of the above or below examples in which: the movement within the manage mode is performed responsive to recognition of a gesture involving selection of the one or more of the representations or a header of the group of the representations and maintaining the selection through movement from the one location to the other, at which the gesture is completed; the gesture is not recognizable by the computing device as corresponding to the movement of the one or more representations or group of representations outside of the manage mode; and the movement outside of the manage mode is performable responsive to recognition of use of a cursor to select the one or more of the representations or the header of the group of the representations and maintain the selection through movement from the one location to the other, at which the gesture is completed.

An example as described alone or in combination with any of the above or below examples, wherein the customization of the representations includes resizing of at least one of the representations.

An example as described alone or in combination with any of the above or below examples, the customization of the representations includes naming of one of the representations or a group of the representations.

In one or more examples, a computing device includes a processing system configured to execute one or more instructions and one or more computer-readable storage media having the one or more instructions stored thereon that, responsive to execution by the processing system, causes the processing system to control interaction with a plurality of representations of applications or content in an application launcher. The plurality of representations are selectable to navigate to a user interface corresponding with a respective said application or content. The control is configured to output a context menu responsive to a gesture-type interaction in relation to respective ones of the plurality of representations having access to one or more commands that is different than a context menu output in relation to the respective ones of the plurality of representations that is output in response to a cursor-type or keyboard-type interaction.

An example as described alone or in combination with any of the above or below examples, wherein the context menu output in response to the gesture-type input includes a menu having a first set of commands and a submenu having a second set of commands that is different that the first set of commands; and the context menu that is output in response to the cursor-type or keyboard-type interaction has a menu having the second set of commands and a submenu having the first set of commands.

An example as described alone or in combination with any of the above or below examples, wherein the first set of commands support customization of the representation and the second set of commands do not.

In one or more examples, a computing device includes a processing system configured to execute one or more instructions and one or more computer-readable storage media having the one or more instructions stored thereon that maintain an operating system configured to perform operations involving control of interaction with a plurality of representations of applications or content in an application launcher. The operations includes responsive to detection that a gesture type of interaction is used in relation to the application launcher to perform a customization, entering a manage mode in which customization of the representations is initiated using gestures that are not usable to initiate the customization outside the manage mode. The operations also include responsive to detection that a non-gesture type of interaction is used in relation to the application launcher to perform a customization, enabling the customization of the representations using a cursor control device or keyboard, respectively, without entering the manage mode.

An example as described alone or in combination with any of the above or below examples, wherein the manage mode is associated with one or more visuals output as part of the customization and the one or more visuals are also output as part of the customization that is enabled by the cursor or keyboard type of interaction.

An example as described alone or in combination with any of the above or below examples, wherein the one or more visuals include reducing a size of a display of the plurality of representations or increasing an amount of area in the application launcher disposed between the plurality of representations, one to another.

An example as described alone or in combination with any of the above or below examples, wherein the manage mode supports output of a context menu in relation to respective ones of the plurality of representations having access to one or more commands that is different than a context menu output in relation to the respective ones of the plurality of representations when not in the manage mode.

An example as described alone or in combination with any of the above or below examples, wherein: the context menu output in the manage mode includes a menu having a first set of commands and a submenu having a second set of commands that is different that the first set of commands; and the context menu that is not output in the manage mode has a menu having the second set of commands and a submenu having the first set of commands.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
controlling interaction with a plurality of representations of applications or content in an application launcher by a computing device, the plurality of representations selectable to navigate to a user interface corresponding with a respective said application or content, the controlling including:
detecting which of a plurality of types of interaction are used by a user in relation to the application launcher;
optimizing customization of the representations based upon the detected type of interaction by:
responsive to the detecting that a gesture type of interaction comprising a first gesture input is used, entering a manage mode in which customization or commands of the representations is initiated using gestures that are not usable to initiate the customization or commands outside the manage mode, where the manage mode is characterized by a shrinking of a display size of each representation and increasing the size of gaps disposed between the representations;
wherein a first context menu is output in response to a second gesture input within the manage mode, the first context menu includes a menu having a first set of commands and a submenu having a second set of commands; and
responsive to the detecting that a cursor or keyboard type of interaction comprising a first cursor or keyboard input is used, enabling the customization or commands of the representations using a cursor control device or keyboard, respectively, without entering the manage mode by increasing a size of the application launcher and increasing the size of gaps disposed between the representations;
wherein a second context menu is output in response to a second cursor or keyboard input without entering the manage mode, the second context menu includes a menu having the second set of commands and a submenu having the first set of commands;
wherein the manage mode is associated with one or more visuals output as part of the customization and the same one or more visuals output in the manage mode are also output as part of the customization that is enabled by the cursor or keyboard type of interaction to support consistency between the manage mode and customization enabled by the cursor or keyboard type of interaction.

2. The method as described in claim 1, wherein the one or more visuals include reducing a size of a display of the plurality of representations or increasing an amount of area in the application launcher disposed between the plurality of representations, one to another.

3. The method as described in claim 1, wherein the manage mode supports output of a context menu in relation to respective ones of the plurality of representations having access to one or more commands that is different than a context menu output in relation to the respective ones of the plurality of representations when not in the manage mode.

4. The method as described in claim 1, wherein the first set of commands support customization of the representation and the second set of commands do not.

5. The method as described in claim 1, wherein the detecting that the gesture type of interaction is used is performed by recognizing selection of a respective said representation or header of a group of said representations using touchscreen functionality of a display device or a camera.

6. The method as described in claim 1, wherein at least one of the gestures used to perform the customization of the representations in the manage mode causes panning of the application launcher when not in the manage mode.

7. The method as described in claim 1, wherein the customization of the representations involves movement of one or more of the representations or a group of the representations from one location to another in the application launcher.

8. The method as described in claim 7, wherein:
the movement within the manage mode is performed responsive to recognition of a gesture involving selection of the one or more of the representations or a header of the group of the representations and maintaining the selection through movement from the one location to the other, at which the gesture is completed;
the gesture is not recognizable by the computing device as corresponding to the movement of the one or more representations or group of representations outside of the manage mode; and
the movement outside of the manage mode is performable responsive to recognition of use of a cursor to select the one or more of the representations or the header of the group of the representations and maintain the selection through movement from the one location to the other, at which the gesture is completed.

9. The method as described in claim 1, wherein the customization of the representations includes resizing of at least one of the representations.

10. The method as described in claim 1, wherein the customization of the representations includes naming of one of the representations or a group of the representations.

11. The method as described in claim 1, wherein the manage mode facilitate customization of the plurality of representations in the application launcher only when a gesture-type interaction is used.

12. A computer-readable storage media storing computer-readable instructions that when executed cause a computing device to:

control interaction with a plurality of representations of applications or content in an application launcher by a computing device, the plurality of representations selectable to navigate to a user interface corresponding with a respective said application or content, the controlling including:

detect which of a plurality of types of interaction are used by a user in relation to the application launcher;

optimize customization of the representations based upon the detected type of interaction by:

responsive to the detecting that a gesture type of interaction comprising a first gesture input is used, enter a manage mode in which customization or commands of the representations is initiated using gestures that are not usable to initiate the customization or commands outside the manage mode, where the manage mode is characterized by a shrinking of a display size of each representation and increasing the size of gaps disposed between the representations;

wherein a first context menu is output in response to a second gesture input within the manage mode, the first context menu includes a menu having a first set of commands and a submenu having a second set of commands; and responsive to the detecting that a cursor or keyboard type of interaction comprising a first cursor or keyboard input is used, enable the customization or commands of the representations using a cursor control device or keyboard, respectively, without entering the manage mode by increasing a size of the application launcher and increasing the size of gaps disposed between the representations;

wherein a second context menu is output in response to a second cursor or keyboard input without entering the manage mode, the second context menu includes a menu having the second set of commands and a submenu having the first set of commands;

wherein the manage mode is associated with one or more visuals output as part of the customization and the same one or more visuals output in the manage mode are also output as part of the customization that is enabled by the cursor or keyboard type of interaction to support consistency between the manage mode and customization enabled by the cursor or keyboard type of interaction.

13. The computer-readable storage media as described in claim 12, wherein the first set of commands support customization of the representation and the second set of commands do not.

14. A computer-readable storage media storing computer-readable instructions that when executed cause a computing device to:

maintain an operating system configured to perform operations involving control of interaction with a plurality of representations of applications or content in an application launcher, the operations comprising:

control interaction with a plurality of representations of applications or content in an application launcher by a computing device, the plurality of representations selectable to navigate to a user interface corresponding with a respective said application or content, the controlling including:

detect which of a plurality of types of interaction are used by a user in relation to the application launcher;

optimize customization of the representations based upon the detected type of interaction by:

responsive to the detecting that a gesture type of interaction comprising a first gesture input is used, enter a manage mode in which customization or commands of the representations is initiated using gestures that are not usable to initiate the customization or commands outside the manage mode, where the manage mode is characterized by a shrinking of a display size of each representation and increasing the size of gaps disposed between the representations;

wherein a first context menu is output in response to a second gesture input within the manage mode, the first context menu includes a menu having a first set of commands and a submenu having a second set of commands; and responsive to the detecting that a cursor or keyboard type of interaction comprising a first cursor or keyboard input is used, enable the customization or commands of the representations using a cursor control device or keyboard, respectively, without entering the manage mode by increasing a size of the application launcher and increasing the size of gaps disposed between the representations;

wherein a second context menu is output in response to a second cursor or keyboard input without entering the manage mode, the second context menu includes a menu having the second set of commands and a submenu having the first set of commands;

wherein the manage mode is associated with one or more visuals output as part of the customization and the same one or more visuals output in the manage mode are also output as part of the customization that is enabled by the cursor or keyboard type of interaction to support consistency between the manage mode and customization enabled by the cursor or keyboard type of interaction.

15. The computer-readable storage media as described in claim 14, wherein the manage mode supports output of a context menu in relation to respective ones of the plurality of representations having access to one or more commands that is different than a context menu output in relation to the respective ones of the plurality of representations when not in the manage mode.

16. The computer-readable storage media as described in claim 14, wherein the manage mode facilitate customization of the plurality of representations in the application launcher only when a gesture-type interaction is used.

\* \* \* \* \*